US011629689B2

(12) United States Patent
Kirkegaard et al.

(10) Patent No.: US 11,629,689 B2
(45) Date of Patent: Apr. 18, 2023

(54) POLYURETHANE MATERIAL, PROCESS FOR PREPARING SUCH MATERIAL AND PROTECTIVE COVER FOR WIND TURBINE BLADE

(71) Applicant: POLYTECH A/S, Bramming (DK)

(72) Inventors: Mads Kirkegaard, Bramming (DK); Richard Baker, Bramming (DK)

(73) Assignee: POLYTECH A/S, Bramming (DK)

( * ) Notice: Subject to any disclaimer, the term of this patent is extended or adjusted under 35 U.S.C. 154(b) by 661 days.

(21) Appl. No.: 15/525,244

(22) PCT Filed: Nov. 10, 2015

(86) PCT No.: PCT/IB2015/058674
§ 371 (c)(1),
(2) Date: May 8, 2017

(87) PCT Pub. No.: WO2016/075619
PCT Pub. Date: May 19, 2016

(65) Prior Publication Data
US 2017/0314532 A1    Nov. 2, 2017

(30) Foreign Application Priority Data

Nov. 10, 2014  (DK) ........................... PA 2014 00650
Apr. 1, 2015   (DK) ........................... PA 2015 00208

(51) Int. Cl.
*F03D 1/06*     (2006.01)
*C08G 18/65*    (2006.01)
(Continued)

(52) U.S. Cl.
CPC ....... *F03D 1/0675* (2013.01); *C08G 18/3206* (2013.01); *C08G 18/6511* (2013.01);
(Continued)

(58) Field of Classification Search
CPC ........ F03D 1/0675; F03D 80/40; F03D 80/30; C08G 18/7671; C08G 18/6511;
(Continued)

(56) References Cited

U.S. PATENT DOCUMENTS 3,467,572 A * 9/1969 Leo .................. B32B 27/00
                                              181/290
3,746,689 A * 7/1973 Lakshmi et al. ... C08G 18/8087
                                              528/45
(Continued)

FOREIGN PATENT DOCUMENTS

CN       1867770 A      11/2006
CN     101802039 A       8/2010
(Continued)

OTHER PUBLICATIONS

Givens, "Polyurethane as Erosion Resistant Material for Helicopter Rotor Blades", USAAML Technical Report 65-39, May 1965, pp. 1-48.
(Continued)

*Primary Examiner* — Kevin A Lathers
(74) *Attorney, Agent, or Firm* — Birch, Stewart, Kolasch & Birch, LLP

(57) ABSTRACT

The polyurethane material is prepared from a polyol, butanediol, and an isocyanate. The protective cover is adapted to be attached along at least a part of a longitudinal edge of the wind turbine blade by adhesion of an inside of the protective cover to a surface of the longitudinal edge of the wind turbine blade. The protective cover is elongated in a longitudinal direction and has an at least substantially U-formed cross-section. The protective cover includes a central cover section extending in the longitudinal direction and two peripheral cover sections extending in the longitudinal direction at either side of the central cover section, respectively. The central cover section has a minimum thickness of at
(Continued)

least 1 millimetre, and each peripheral cover section has a thickness decreasing from a maximum thickness of at least 1 millimetre to a minimum thickness of less than ½ millimetre.

34 Claims, 3 Drawing Sheets

(51) Int. Cl.
    *C08L 75/04*     (2006.01)
    *C08G 18/32*     (2006.01)
    *C08G 18/76*     (2006.01)
    *C08J 5/12*     (2006.01)
    *F03D 80/30*     (2016.01)
    *F03D 80/40*     (2016.01)
    *B29D 99/00*     (2010.01)
    *B29K 75/00*     (2006.01)

(52) U.S. Cl.
    CPC .......... *C08G 18/7671* (2013.01); *C08J 5/124* (2013.01); *C08L 75/04* (2013.01); *B29D 99/0025* (2013.01); *B29K 2075/00* (2013.01); *C08J 2375/04* (2013.01); *C08J 2475/04* (2013.01); *F03D 80/30* (2016.05); *F03D 80/40* (2016.05); *F05B 2230/20* (2013.01); *F05B 2230/23* (2013.01); *F05B 2230/40* (2013.01); *F05B 2280/4003* (2013.01); *F05B 2280/4011* (2013.01); *Y02E 10/72* (2013.01); *Y02P 70/50* (2015.11)

(58) Field of Classification Search
    CPC ...... C08G 18/3206; C08G 18/40; C08J 5/124; C08J 2475/04; C08J 2375/04; B29D 99/0025; B29K 2075/00; Y02P 70/523; Y02E 10/721; F05B 2280/4011; F05B 2230/20; F05B 2230/23; F05B 2230/40; F05B 2280/4003
    See application file for complete search history.

(56) References Cited

U.S. PATENT DOCUMENTS

| | | | | |
|---|---|---|---|---|
| 4,123,578 | A * | 10/1978 | Perrington | B41M 5/46 428/206 |
| 4,202,957 | A * | 5/1980 | Bonk | C08G 18/10 528/66 |
| 4,727,094 | A * | 2/1988 | Hoy | C08G 65/26 528/80 |
| 2004/0118978 | A1 | 6/2004 | Anning | |
| 2005/0079351 | A1 * | 4/2005 | Isogawa | A63B 37/0003 428/402 |
| 2005/0169763 | A1 | 8/2005 | Anning | |
| 2007/0036659 | A1 * | 2/2007 | Hibbard | B29C 63/22 416/233 |
| 2007/0128445 | A1 * | 6/2007 | Williams | B29C 37/0032 428/423.1 |
| 2010/0135817 | A1 * | 6/2010 | Wirt | F03D 1/0675 416/226 |
| 2010/0234553 | A1 * | 9/2010 | Muehlfeld | C08G 18/3206 528/67 |
| 2010/0266799 | A1 * | 10/2010 | Koonce | C08G 18/0885 428/36.9 |
| 2011/0142678 | A1 | 6/2011 | Santiago et al. | |
| 2011/0159281 | A1 * | 6/2011 | Marx | B82Y 30/00 428/343 |
| 2012/0007270 | A1 * | 1/2012 | Shafiq | C08G 18/6607 264/128 |
| 2012/0156049 | A1 | 6/2012 | Hong | |
| 2012/0163981 | A1 | 6/2012 | Hong | |
| 2013/0045105 | A1 * | 2/2013 | Driver | F03D 1/0675 416/224 |
| 2013/0183161 | A1 * | 7/2013 | Richtman | F03D 1/0675 416/232 |
| 2014/0186188 | A1 | 7/2014 | Takeuchi | |
| 2014/0343180 | A1 * | 11/2014 | Crain | C08J 9/0061 521/106 |

FOREIGN PATENT DOCUMENTS

| | | |
|---|---|---|
| CN | 102165668 A | 8/2011 |
| CN | 102234420 A | 11/2011 |
| DK | 172126 B1 | 11/1997 |
| EP | 2383305 A1 | 11/2011 |
| EP | 2551314 A1 | 1/2013 |
| EP | 2 927 482 A1 | 10/2015 |
| ES | 2 333 929 A1 | 3/2010 |
| ES | 2333929 A1 | 3/2010 |
| JP | 2011-52683 A | 3/2011 |
| WO | WO 02/06370 A1 | 1/2002 |
| WO | WO 2004/076852 A2 | 9/2004 |
| WO | WO 2004/092241 A1 | 10/2004 |
| WO | WO 2007/048141 A2 | 4/2007 |
| WO | WO 2008/089163 A1 | 7/2008 |
| WO | WO 2009/023424 A2 | 2/2009 |
| WO | WO 2013/012699 A2 | 1/2013 |
| WO | WO 2013/019524 A1 | 2/2013 |
| WO | WO 2013/092211 A1 | 6/2013 |
| WO | WO 2013/137964 A2 | 9/2013 |
| WO | WO 2013/172823 A1 | 11/2013 |

OTHER PUBLICATIONS

Legault, "Wind blades: Progress and challenges", (published online Oct. 1, 2013), 8 pages.
Zhang, Shizhong "Accelerated rain erosion of wind turbine blade coatings", DTU Chemical Engineering; Department of Chemical and Biochemical Engineering; Publication Date 2014: dowloaded from orbit.dtu.dk on Mar. 31, 2021.
Decision issued Sep. 21, 2021 from the Oppositiion Division in corresponding European Application No. 15797456.9.
3M, "3M Wind Blade Protection Coating W4600 Kit (10x250ML)," Safety Data Sheet, Dec. 4, 2012, 27 pages.
Becker et al., "Kunststoff Handbuch 7 Polyurethane," 1983, pp. 70-71, 84-85, 98-99, 391-411 (17 pages total).
Falbe et al., "Rompp Chemie Lexikon," 9. Auflage, Band 5 PI-S, 1995, 4 pages.
Keegan et al., "On erosion issues associated with the leading edge of wind turbine blades," J. Phys. D: Appl. Phys., vol. 46, Sep. 4, 2013, pp. 1-20 (21 pages total).
Mackey, "Introduction to elastomers," Chapter 19 of The Polyurethanes Book, Eds. Randall et al., 2002, pp. 162-163, 285-299 (11 pages total).
Saunders et al., "Polyurethanes Chemistry and Technology, Part I. Chemistry," vol. XVI, 1962, pp. 272-279, 282-287, 290-291, 294-303, 306-309, 314-315 (18 pages total).
Woods, "The ICI Polyurethanes Book," 1987, pp. 4-5, 182-187 (6 pages total).

* cited by examiner

POLYURETHANE MATERIAL, PROCESS FOR PREPARING SUCH MATERIAL AND PROTECTIVE COVER FOR WIND TURBINE BLADE

TECHNICAL FIELD OF THE INVENTION

The present invention furthermore relates to a preformed protective cover for a wind turbine blade.

The present invention relates to an integrated system as part of a wind turbine blade structure and associated fabrication processes for improving the resilience of wind turbine blades to all or a subset of lightning strikes, leading edge environmental erosion, aerodynamic enhancement and blade icing. The invention also extends to the specific composition and properties of the associated materials used in the said system in addition to the application and fabrication process.

BACKGROUND OF THE INVENTION

EP 0 037 987 A2 (Messerschmitt-Bölkow-Blohm Gesellschaft) discloses a nose cover and a rear end cover for wings, rotor blades, etc.

WO 2004/076852 A2 (Vestas Wind Systems A/S) describes a front edge cover that is preformed to fit a wind turbine blade and subsequently adhered to the blade.

WO 2010/122157 A1 (Hempel A/S) discloses a specific chemical composition of a polyurethane coating.

However, according to prior art methods, it has been difficult to obtain good results.

One object of the present invention is to provide an improved preformed protective cover for a wind turbine blade.

In view of this object, the preformed protective cover is made of a polymer material, such as a polyether based polyurethane, the preformed protective cover is adapted to be attached along at least a part of a longitudinal edge of the wind turbine blade by adhesion of an inside of the preformed protective cover to a surface of the longitudinal edge of the wind turbine blade, the preformed protective cover is elongated in a longitudinal direction and has an at least substantially U-formed cross-section, the preformed protective cover includes a central cover section extending in the longitudinal direction and two peripheral cover sections extending in the longitudinal direction at either side of the central cover section, respectively, the central cover section has a minimum thickness of at least 1 millimetre, and each peripheral cover section has a thickness decreasing from a maximum thickness of at least 1 millimetre to a minimum thickness of less than ½ millimetre.

Wind turbines are operated in extreme environmental conditions where the wind turbine blades in particular are vulnerable to leading edge erosion, lightning strike and icing.

A lightning strike event has the potential to cause physical damage to the turbine blade structure. Leading edge erosion has the possibility to cause physical damage to the leading edge of the blade. Blade icing causes the wind turbine to be shut down for extended periods.

Accordingly, in recent years much effort has been made by wind turbine manufacturers to improve the robustness of wind turbine blades so that they are able to operate effectively in the environment in order to avoid damage to the blade and the cost associated with turbine down-time during blade repair/replacement.

In general, lightning protection systems for wind turbine blades are known, so to are methods for improving the robustness of the leading edge to erosion, and various systems exist for de-icing the blade. However, the protection requirements for the current discrete protection systems are often mutually exclusive and at this time there is no known protection system that can protect a wind turbine blade against the effects of lightning, leading edge erosion and de-icing simultaneously.

It is against this context that the second invention has been devised.

SUMMARY OF THE INVENTION

The present invention relates to a polyurethane material.

The polyurethane material is characterised by being prepared from a polyol, butanediol, and an isocyanate.

In an embodiment, the isocyanate is an optionally modified diphenylmethane 4,4'-diisocyanate.

In an embodiment, the butanediol is 1,4-butanediol.

In an embodiment, the polyurethane material comprises an UV stabilisator and/or colour pigment(s).

The present invention further relates to a process for preparing a polyurethane, characterised by
a) mixing a polyol and butanediol,
b) tempering and degassing the mixture according to a),
c) tempering and degassing an isocyanate,
d) pumping the degassed mixture according to b) and the degasses isocyanate according to c) through a mixing head into a mould,
e) curing in the mould, and
f) demoulding the cured item.

The present invention further relates to a process for preparing a protective cover for a wind turbine blade, characterised by
a) mixing a polyol and butanediol,
b) tempering and degassing the mixture according to a),
c) tempering and degassing an isocyanate,
d) pumping the degassed mixture according to b) and the degasses isocyanate according to c) through a mixing head into a mould,
e) curing in the mould, and
f) demoulding the cured item.

In an embodiment, in the polyurethane material or the process, the tempering according to b) and/or c) is carried out at a temperature from 30° C. to 50° C.

In an embodiment, in the polyurethane material or the process, the tempering according to b) and/or c) is carried out at a temperature about 40° C.

In an embodiment, the mould in step d) is preheated.

In an embodiment, the mould in step d) is preheated to a temperature from 90° C. to 120° C.

In an embodiment, the mould in step d) is preheated to a temperature about 100° C.

In an embodiment, wherein the curing in step e) is carried out at a temperature from 90° C. to 120° C.

In an embodiment, the curing in step e) is carried out at a temperature of about 100° C.

In an embodiment, the curing in step e) is carried out for about 15 minutes.

In an embodiment, the process comprises a further step: g) post-curing.

In an embodiment, the post-curing in step g) takes place in about 12 hours at a temperature of about 100° C.

In an embodiment, in the polyurethane material or the process, the polyol, butanediol, and isocyanate are used in a ratio by weight polyol:butanediol:isocyanate of 100:(3 to 5):(30 to 35).

In an embodiment, in the polyurethane material or the process, the polyol, butanediol, and isocyanate are used in a ratio by weight polyol:butanediol:isocyanate of 100:4:32.3.

In an embodiment, in the polyurethane material or the process, the polyol comprises an UV stabilisator and/or colour pigment(s).

In an embodiment, in the polyurethane material or the process, the polyol is Bayflex® OS 380-A-59A.

In an embodiment, in the polyurethane material or the process, the isocyanate is 35 DFSMODUR® PF.

In an embodiment, in the polyurethane material or the process, butanediol is 1,4-butanediol.

Advantageous embodiments of the preformed protective cover are described below.

In an embodiment, the maximum thickness of each peripheral cover section corresponds to the minimum thickness of the central cover section.

In an embodiment, the minimum thickness of the central cover section is at least 2 millimetres, preferably at least 3 millimetres, more preferred at least 4 millimetres and most preferred approximately 5 millimetres.

In an embodiment, the thickness of the central cover section is at least substantially constant from side to side of the central cover section.

In an embodiment, the minimum thickness of each peripheral cover section is less than $1/3$ millimetre, preferably less than $1/5$ millimetres, more preferred less than $1/7$ millimetres and most preferred approximately $1/10$ millimetres.

In an embodiment, each peripheral cover section has a thickness decreasing at least substantially constantly from its maximum thickness to its minimum thickness.

In an embodiment, the width of each peripheral cover section is at least 3 percent, preferably at least 7 percent, more preferred at least 12 percent and most preferred at least 15 percent of the total width of the preformed protective cover.

In an embodiment, the total width of the preformed protective cover is at least 30 millimetres, preferably at least 50 millimetres, more preferred at least 100 millimetres and most preferred approximately 150 to 250 millimetres.

In an embodiment, the total width of the preformed protective cover increases in the longitudinal direction.

In an embodiment, the inside of the preformed protective cover is provided with a number of protrusions having a height of between $1/2$ and 2 millimetres, preferably approximately 1 millimetre.

In an embodiment, the preformed protective cover has a symmetry axis extending in the longitudinal direction, and wherein the inside of the preformed protective cover at either side of the symmetry axis is provided with a number of spaced elongated protrusions extending with an oblique angle in relation to the longitudinal direction.

The invention further relates to a wind turbine blade including a preformed protective cover as described above, wherein the preformed protective cover is attached along at least a part of a longitudinal edge of the wind turbine blade by adhesion to a surface of the longitudinal edge of the wind turbine blade.

In an embodiment, the wind turbine blade includes a first blade shell and a second blade shell joined together to form a wind turbine blade along a first longitudinal joint at a leading edge of the wind turbine blade and along a second longitudinal joint at a trailing edge of the wind turbine blade, and wherein the preformed protective cover is attached at least approximately symmetrical about the first or second longitudinal joint, and preferably about the first longitudinal joint.

The invention furthermore relates to a method of providing a wind turbine blade with a preformed protective cover as described above. The preformed protective cover is attached along at least a part of a longitudinal edge of the wind turbine blade by adhesion of the inside of the preformed protective cover to a surface of the longitudinal edge of the wind turbine blade, whereby the adhesion is performed by the following steps:

providing an adhesive, such as a two component polyurethane adhesive, on the inside of the preformed protective cover, pressing the inside of the preformed protective cover against the surface of the longitudinal edge of the wind turbine blade, and removing excess adhesive leaking between each peripheral cover section and the surface of the longitudinal edge of the wind turbine blade.

Advantageous embodiments of the method are described below.

In an embodiment, the adhesive is provided as string of adhesive on the inside of the preformed protective cover at least substantially along a longitudinal symmetry axis of the preformed protective cover.

In an embodiment, the preformed protective cover is produced by the following steps:

providing a male form part having a geometry resembling or at least substantially matching the outer geometry of the at least part of the longitudinal edge of the wind turbine blade, providing a female form part having a geometry matching the male form part, but being slightly larger, closing the male form part against the female form part thereby forming a form cavity, pouring the adhesive into the form cavity, and opening the form cavity by separating the male form part from the female form part and ejecting the moulded preformed protective cover.

In an embodiment, the wind turbine blade is provided with the preformed protective cover as a repair operation, whereby an area of said surface of the longitudinal edge of the wind turbine blade corresponding to the preformed protective cover is machined, such as by grinding or milling, before attachment of the preformed protective cover.

In an embodiment, the wind turbine blade is provided with the preformed protective cover when the wind turbine blade is still mounted on a wind turbine.

In an embodiment, the preformed protective cover as described above is made of a polymer material in the form of a polyurethane material as defined or as prepared in any one of the above embodiments.

In an embodiment, a wind turbine blade includes said preformed protective cover made of a polymer material in the form of a polyurethane material as defined in or as prepared in any one of the above embodiments.

In an embodiment of a method of providing a wind turbine blade with a preformed protective cover, said preformed protective cover is made of a polymer material in the form of a polyurethane material as defined in or as prepared in any one of the above embodiments.

A second invention furthermore relates to a method of making a wind turbine blade component incorporating an integrated lightning protection enhancement, leading edge protection, aerodynamic enhancement and de-ice system, the method comprises:

providing the over moulding of a one piece novel polyurethane material to the blade tip region, the said material completely covering the outer surface of the blade leading edge, the said material covering the interface between the blade shell laminate and the solid metal tip lightning receptor; the integration of a novel polyurethane dielectric and aerodynamic fence at the interface between the blade shell laminate and the solid metal tip lightning receptor; further aerodynamic fences integrated at optimised positions chord-wise on the blade; integration of a novel composite heating layer to the leading edge of the blade; and integration of a lightning receptor component for the protection of the said de-ice layer.

In an embodiment of the second invention, the novel polyurethane material is a polyurethane material as defined in or as prepared in any one of the above embodiments.

In a first aspect, the second invention comprising: providing the over moulding of a one piece novel polyurethane material to the blade tip region; the said material completely covering the outer surface of the blade leading edge; the said material covering the interface between the blade shell laminate and the solid metal tip lightning receptor; the integration of a novel polyurethane dielectric and aerodynamic fence at the interface between the blade shell laminate and the solid metal tip lightning receptor; further aerodynamic fences integrated at optimised positions chord-wise on the blade; integration of a novel composite heating later to the leading edge of the blade; integration of a lightning receptor component for the protection of the said de-ice layer.

The aerodynamic and dielectric fence components could be pre-cast using the novel polyurethane material with optimised mechanical, environmental and electrical properties in the precise geometry dictated by the turbine blade outer geometry.

The de-ice heating layer and associated lightning protection layer can be applied to a preformed polyurethane substrate.

Then, the preformed components of the system are loaded into the novel associated automated tooling developed as part of this invention. The tooling is so designed to fabricate the protection system onto the turbine blade in either a one stage or two stage process depending on whether all or a subset of the elements of the system are employed.

The automated tooling is then located and clamped around the tip end of the wind turbine blade in question. This operation shall be performed as part of the finish operation in a blade factory or on an existing blade that has been removed from the wind turbine for maintenance.

The automated tooling then fabricates the complete protection system onto the wind turbine blade and remains in place until the process has completed and the protection system is fully cured and bonded to the blade shell. No further finish operations are required unless the end user requires the system to be painted as part of the normal blade paint process.

When the protection system requires the inclusion of the de-ice sub-system, the associated power and control sub-system shall be installed in the wind turbine blade prior to the aforementioned blade finish operation.

The dielectric/aerodynamic fence at the interface between the blade shell laminate and solid metal tip lightning receptor has three novel functions; Firstly, the material forms an environmental protection layer covering the leading edge interface between the solid metal tip lightning receptor and the blade laminate in order to protect the said interface from erosion due to rain and other particulates experienced during normal operation. Secondly, the dielectric fence, which is positioned over the interface and runs chord-wise adjacent to the solid metal tip receptor, with a vertical extent at a defined angle to the blade surface prevents the lightning strike arc root from attaching to a position on the said solid metal tip receptor that would normally cause localized heat damage to the blade shell laminate, thus improving the robustness of the protection system. Third, the vertical extent of the fence with novel geometry reduces the blade drag by partially recovering the tip vortex energy, thus improving efficiency.

The novel polyurethane material positioned completely around the leading edge of the wind turbine blade and comprising the absolute outer surface of the said blade protects the blade from leading edge erosion.

The de-ice heating layer is situated directly below the leading edge protection layer at the leading edge of the blade and extends towards the windward and leeward sides of the said blade. The heating layer comprises a novel thin layer carbon composite and polyurethane material, which can be heated by either direct ohmic heating or indirect radio frequency radiation depending on which specific technology shall be deployed. If the ohmic heating method is employed then the power transfer system and associated lightning protection guard band is integrated into the polyurethane substrate and positioned in such a way that the lighting protection prevents damage to the heating system during a lightning event. The said heating layer increases in temperature during operation and provides a rapid uniform surface temperature increase at the leading edge of the blade either preventing the formation of ice or melting and shedding already formed ice depending on the strategy of the control system employed.

The system is fabricated to the blade using an automated moulding process to ensure robust adherence to the blade structure without the need for additional adhesive and manual process.

It will be appreciated that preferred and/or optional features of the first aspect of the second invention may be combined with the other aspects of the invention, and vice versa.

The invention will now be explained in more detail below by means of examples of embodiments with reference to the very schematic drawing, in which

DETAILED DESCRIPTION

Figure 1:
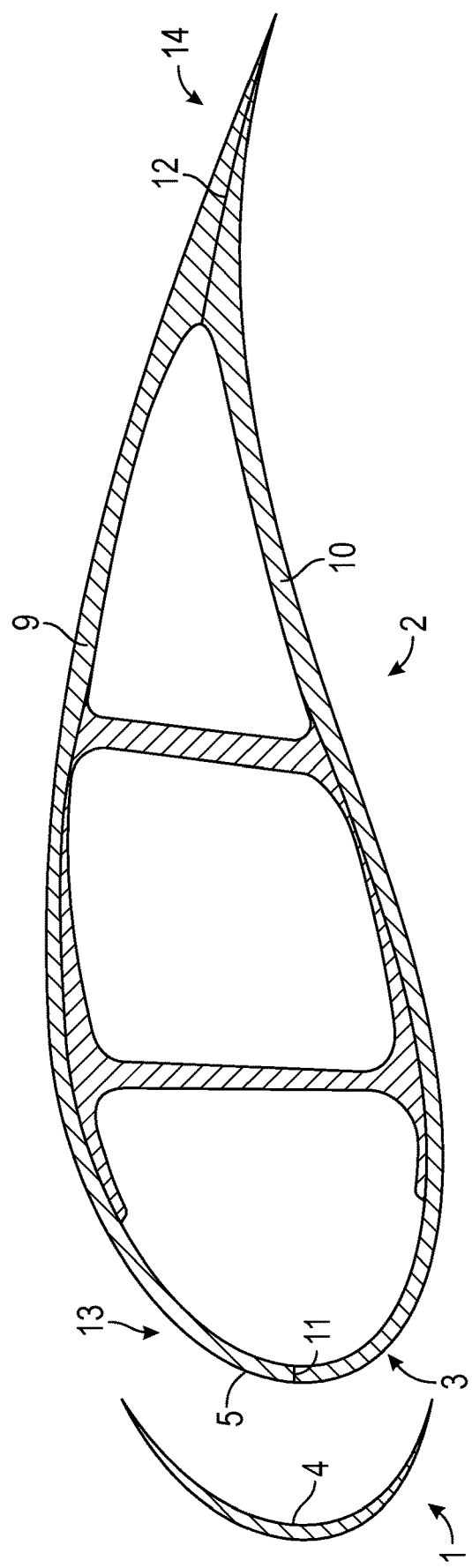
FIG. 1 illustrates a cross-section through a wind turbine blade and a preformed protective cover before attachment to the wind turbine blade.
Figure 2:
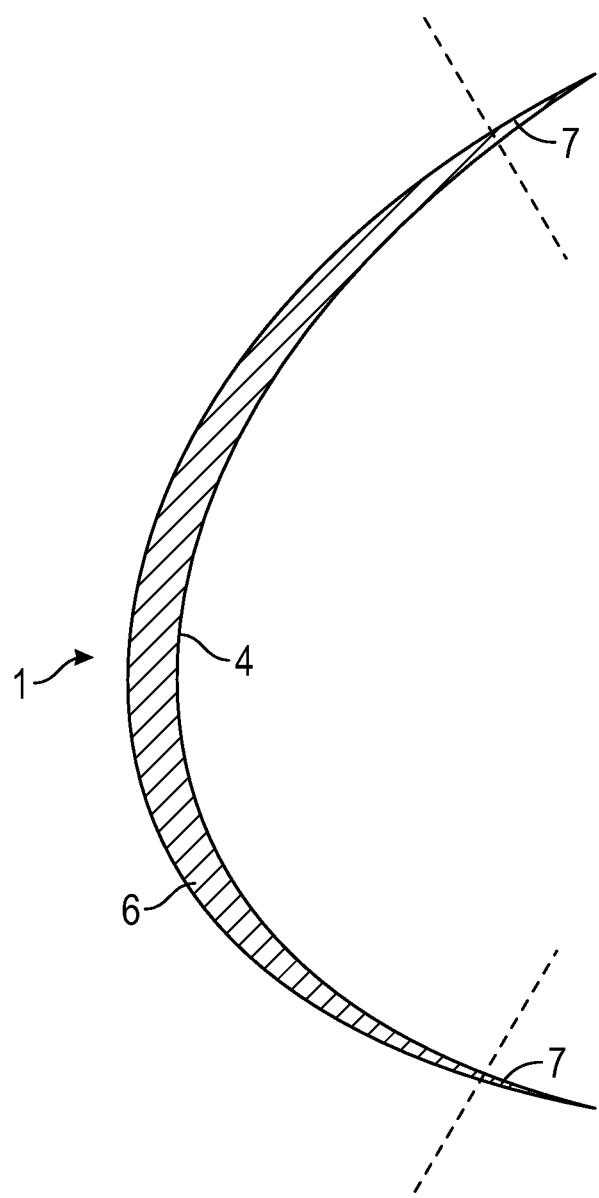
FIG. 2 illustrates on a larger scale a cross-section through the preformed protective cover of FIG. 1.

FIG. 1 shows a preformed protective cover 1 for a wind turbine blade 2, wherein the preformed protective cover 1 is made of a polymer material, such as a polyether based polyurethane. The preformed protective cover 1 is adapted to be attached along at least a part of a longitudinal edge 3 of the wind turbine blade 2 by adhesion of an inside 4 of the preformed protective cover 1 to a surface 5 of the longitudinal edge 3 of the wind turbine blade 2. The preformed protective cover 1 is elongated in a longitudinal direction D and has an at least substantially U-formed cross-section. The preformed protective cover 1 includes a central cover section 6 extending in the longitudinal direction D and two peripheral cover sections 7 extending in the longitudinal direction at either side of the central cover section 6, respectively. The central cover section 6 has a minimum thickness of at least 1 millimetre, and each peripheral cover section 7 has a thickness decreasing from a maximum thickness of at least 1 millimetre to a minimum thickness of less than ½ millimetre.

The particular form of the peripheral cover sections 7 provides for a good transition from the central cover section of the preformed protective cover 1 to the surface of the wind turbine blade 2. A good transition without edges is of great importance in order to avoid that the wind will destroy the materials. A sealing material (sealer) may be applied in a possible groove between an edge of the peripheral cover sections 7 and the surface of the wind turbine blade 2 in order to even further improve the transition.

The maximum thickness of each peripheral cover section 7 may correspond to the minimum thickness of the central cover section. The minimum thickness of the central cover section may be at least 2 millimetres, preferably at least 3 millimetres, more preferred at least 4 millimetres and most preferred approximately 5 millimetres.

The thickness of the central cover section 6 may be at least substantially constant from side to side of the central cover section.

The minimum thickness of each peripheral cover section 7 may be less than ⅓ millimetre, preferably less than ⅕ millimetres, more preferred less than ⅐ millimetres and most preferred approximately 1/10 millimetres.

Each peripheral cover section 7 may have a thickness decreasing at least substantially constantly from its maximum thickness to its minimum thickness.

The width of each peripheral cover section 7 may be at least 3 percent, preferably at least 7 percent, more preferred at least 12 percent and most preferred at least 15 percent of the total width of the preformed protective cover.

The total width of the preformed protective cover 1 may be at least 30 millimetres, preferably at least 50 millimetres, more preferred at least 100 millimetres and most preferred approximately 150 to 250 millimetres.

Figure 3:
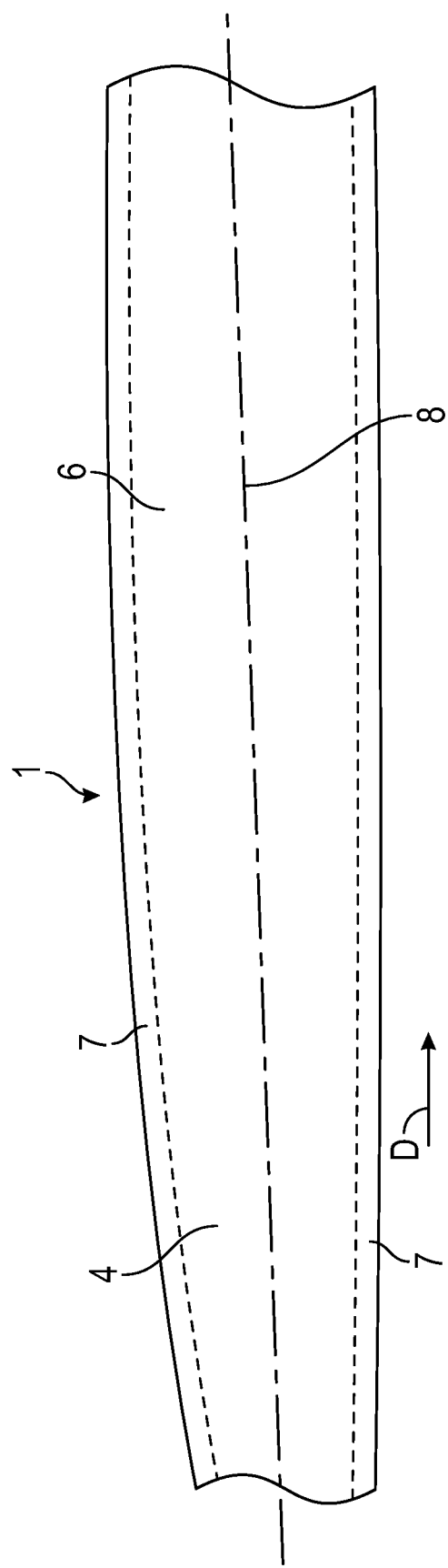
FIG. 3 illustrates the preformed protective cover of FIG. 1 seen from its inside.

The total width of the preformed protective cover 1 may increase in the longitudinal direction as illustrated in FIG. 3.

The inside of the preformed protective cover 1 may be provided with a number of not shown protrusions having a height of between ½ and 2 millimetres, preferably approximately 1 millimetre. Such not shown protrusions may have the function of ensuring an appropriate layer thickness of adhesive between the preformed protective cover 1 and the surface of the wind turbine blade 2.

The preformed protective cover may have a symmetry axis 8 extending in the longitudinal direction D. The inside of the preformed protective cover 1 at either side of the symmetry axis may be provided with a number of not shown spaced elongated protrusions extending with an oblique angle in relation to the longitudinal direction. Such not shown protrusions may in addition to the above-mentioned function have the function of leading the adhesive appropriately from the area around the symmetry axis 8 to the area of the peripheral cover sections 7.

As seen in FIG. 1, the preformed protective cover 1 is adapted to be attached along at least a part of the longitudinal edge 3 of the wind turbine blade 2 by adhesion to the surface 5 of the longitudinal edge of the wind turbine blade.

The wind turbine blade 2 may include a first blade shell 9 and a second blade shell 10 joined together to form 2 wind turbine blade along a first longitudinal joint 11 at a leading edge 13 of the wind turbine blade and along a second longitudinal joint 12 at a trailing edge 14 of the wind turbine blade. The preformed protective cover 1 may be attached at least approximately symmetrical about the first or second longitudinal joint 11, 12, and preferably about the first longitudinal joint 11.

According to a method of providing a wind turbine blade with a preformed protective cover according to the invention, the preformed protective cover 1 is attached along at least a part of a longitudinal edge 3 of the wind turbine blade 2 by adhesion of the inside 4 of the preformed protective cover to a surface 5 of the longitudinal edge of the wind turbine blade. The adhesion is performed by the following steps:

providing an adhesive, such as a two component polyurethane adhesive, on the inside 4 of the preformed protective cover 1, pressing the inside 4 of the preformed protective cover 1 against the surface 5 of the longitudinal edge 3 of the wind turbine blade 2, and removing excess adhesive leaking between each peripheral cover section 7 and the surface 5 of the longitudinal edge 3 of the wind turbine blade 2.

The inside 4 of the preformed protective cover 1 may be pressed against the surface 5 of the longitudinal edge 3 of the wind turbine blade 2 by means of a special tool. For instance, a tools may have a form corresponding to the outside of the preformed protective cover 1 and may be slid along the outside of the preformed protective cover in order to make the preformed protective cover fit as good as possible onto the wind turbine blade.

The adhesive may be provided as string of adhesive on the inside 5 of the preformed protective cover 1 at least substantially along the longitudinal symmetry axis 8 of the preformed protective cover 1. By subsequently positioning the protective cover 1 on the wind turbine blade 2 and pressing on the protective cover 1 substantially along the longitudinal symmetry axis 8, the adhesive may be pressed in the direction of the peripheral cover sections 7 and thereby be suitably distributed.

The preformed protective cover 1 may be produced by the following steps:

providing a not shown male form part having a geometry resembling or at least substantially matching the outer geometry of the at least part of the longitudinal edge 3 of the wind turbine blade 2, providing a not shown female form part having a geometry matching the male form part, but being slightly larger, closing the male form part against the female form part thereby forming a form cavity, pouring the adhesive into the form cavity, and opening the form cavity by separating the male form part from the female form part and ejecting the moulded preformed protective cover 1.

The wind turbine blade 2 may be provided with the preformed protective cover 1 as a repair operation, whereby an area of said surface 5 of the longitudinal edge 3 of the wind turbine blade 2 corresponding to the preformed protective cover 1 is machined, such as by grinding or milling, before attachment of the preformed protective cover 1.

The wind turbine blade 2 may be provided with the preformed protective cover 1 when the wind turbine blade 2 is still mounted on a wind turbine.

Thereby, according to the invention, a damaged wind turbine blade 2 may be repaired in an advantageous way.

The polyurethane material is preferably prepared from a polyol, butanediol, and an isocyanate. The isocyanate may be an optionally modified diphenylmethane 4,4'-diisocyanate. The butanediol may be 1,4-butanediol. The polyurethane material may comprise an UV stabilisator and/or colour pigment(s).

The protective cover for a wind turbine blade may be prepared by
a) mixing a polyol and butanediol,
b) tempering and degassing the mixture according to a),
c) tempering and degassing an isocyanate,
d) pumping the degassed mixture according to b) and the degasses isocyanate according to c) through a mixing head into a mould,
e) curing in the mould, and
f) demoulding the cured item.

The tempering according to b) and/or c) may be carried out at a temperature from 30° C. to 50° C. The tempering according to b) and/or c) may be carried out at a temperature about 40° C. The mould in step d) may be preheated. The mould in step d) may be preheated to a temperature from 90° C. to 120° C. The mould in step d) may be preheated to a temperature about 100° C. The curing in step e) may be carried out at a temperature from 90° C. to 120° C. The curing in step e) may be carried out at a temperature of about 100° C. The curing in step e) may be carried out for about 15 minutes. The process may comprise a further step: g) post-curing. The post-curing in step g) may take place in about 12 hours at a temperature of about 100° C. The polyurethane material or the process, the polyol, butanediol, and isocyanate may be used in a ratio by weight polyol:butanediol:isocyanate of 100:(3 to 5):(30 to 35). The polyol, butanediol, and isocyanate may be used in a ratio by weight polyol:butanediol:isocyanate of 100:4:32.3. The polyol comprises an UV stabilisator and/or colour pigment(s). The polyol may be Bayflex® OS 380-A-59A. The isocyanate may be DESMODUR® PF. Butanediol may be 1,4-butanediol.

COMPARATIVE EXAMPLES

To elucidate the Rain Erosion (RE) durability of the polyurethane material according to the present invention, the durability of the material has been compared to other products.

Annex A illustrates the result of a so-called rain erosion test performed on a sample part of a protective cover for a wind turbine blade made of the polyurethane material according to the present invention. The test has been performed according to ASTM G73-10.

Annex A-1 illustrates the sample part on a larger scale, before start of the test.

Annex A-2 illustrates the sample part at nine different stages of the test. "UV" indicates the number of hours the sample part has been exposed to UV light. "RE" indicates the number of hours the sample part has been exposed to the simulated rain erosion.

Annex A-3 illustrates the sample part at the end of the test. The sample part has been exposed to UV light for 573 hours and has been exposed to the simulated rain erosion for 40 hours. It is seen that no erosion is visible.

Annex B illustrates the result of a rain erosion test performed on a sample part of a protective cover for a wind turbine blade (Blade no. 1); said protective cover not being made of the polyurethane material according to the present invention. The test has been performed according to ASTM G73-10. Annex B-3 illustrates the sample part before start of the test.

Annex B-4 illustrates the sample part when it has been exposed to the simulated rain erosion for 0.5 hours. It is seen that no erosion is visible.

Annex B-5 illustrates the sample part when it has been exposed to the simulated rain erosion for 1 hour. It is seen that severe erosion is visible.

Annex B-6 illustrates the sample part when it has been exposed to the simulated rain erosion for 5.0 hours. It is seen that severe erosion is visible.

Annex B-7 illustrates the sample part when it has been exposed to the simulated rain erosion for 11.5 hours at the end of the test. It is seen that severe erosion is visible.

Annex C illustrates the result of a rain erosion test performed on a sample part of a protective cover for a wind turbine blade (Blade no. 2); said protective cover not being made of the polyurethane material according to the present invention. The test has been performed according to ASTM G73-10.

Annex C-2 illustrates the sample part before start of the test.

Annex C-3 illustrates the sample part when it has been exposed to the simulated rain erosion for 5.0 hours. It is seen that severe erosion is visible.

Annex C-4 illustrates the sample part when it has been exposed to the simulated rain erosion for 10.0 hours. It is seen that severe erosion is visible.

Annex C-5 illustrates the sample part when it has been exposed to the simulated rain erosion for 21.0 hours at the end of the test. It is seen that severe erosion is visible.

Annex D illustrates the result of a rain erosion test performed on a sample part of a protective cover for a wind turbine blade (Blade no. 3); said protective cover not being made of the polyurethane material according to the present invention. The test has been performed according to ASTM G73-10.

Annex D-2 illustrates the sample part before start of the test.

Annex D-3 illustrates the sample part when it has been exposed to the simulated rain erosion for 0.5 hours. It is seen that severe erosion is visible.

Annex D-4 illustrates the sample part when it has been exposed to the simulated rain erosion for 1.5 hours. It is seen that severe erosion is visible.

Annex D-5 illustrates the sample part when it has been exposed to the simulated rain erosion for 3.5 hours at the end of the test. It is seen that severe erosion is visible.

Annex E-1 illustrates respective speeds during the tests performed.

Annex E-2 illustrates respective temperatures during the tests performed.

It is therefore seen that the durability of the polyurethane material according to the present invention is significantly higher than the other tested materials.

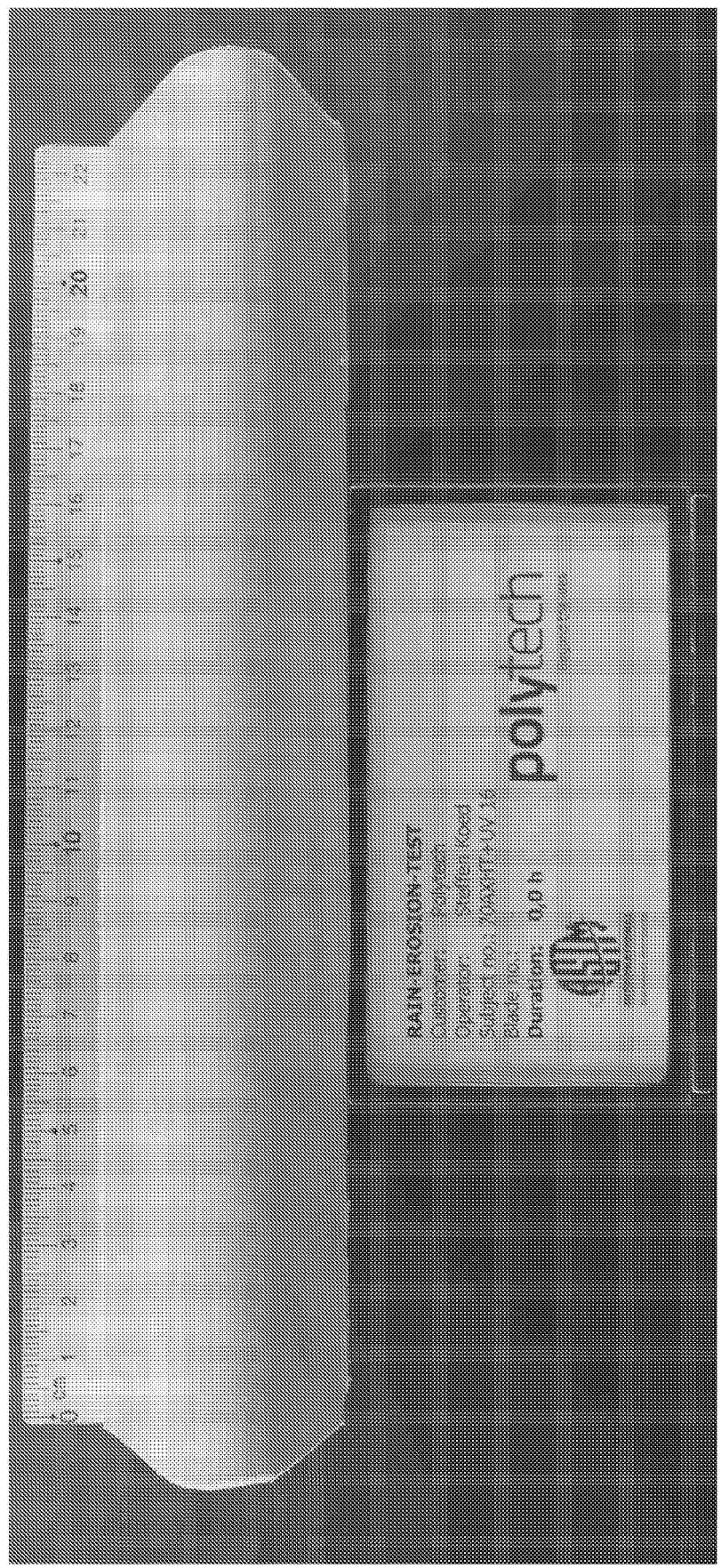
Annex A-1

Annex A-2
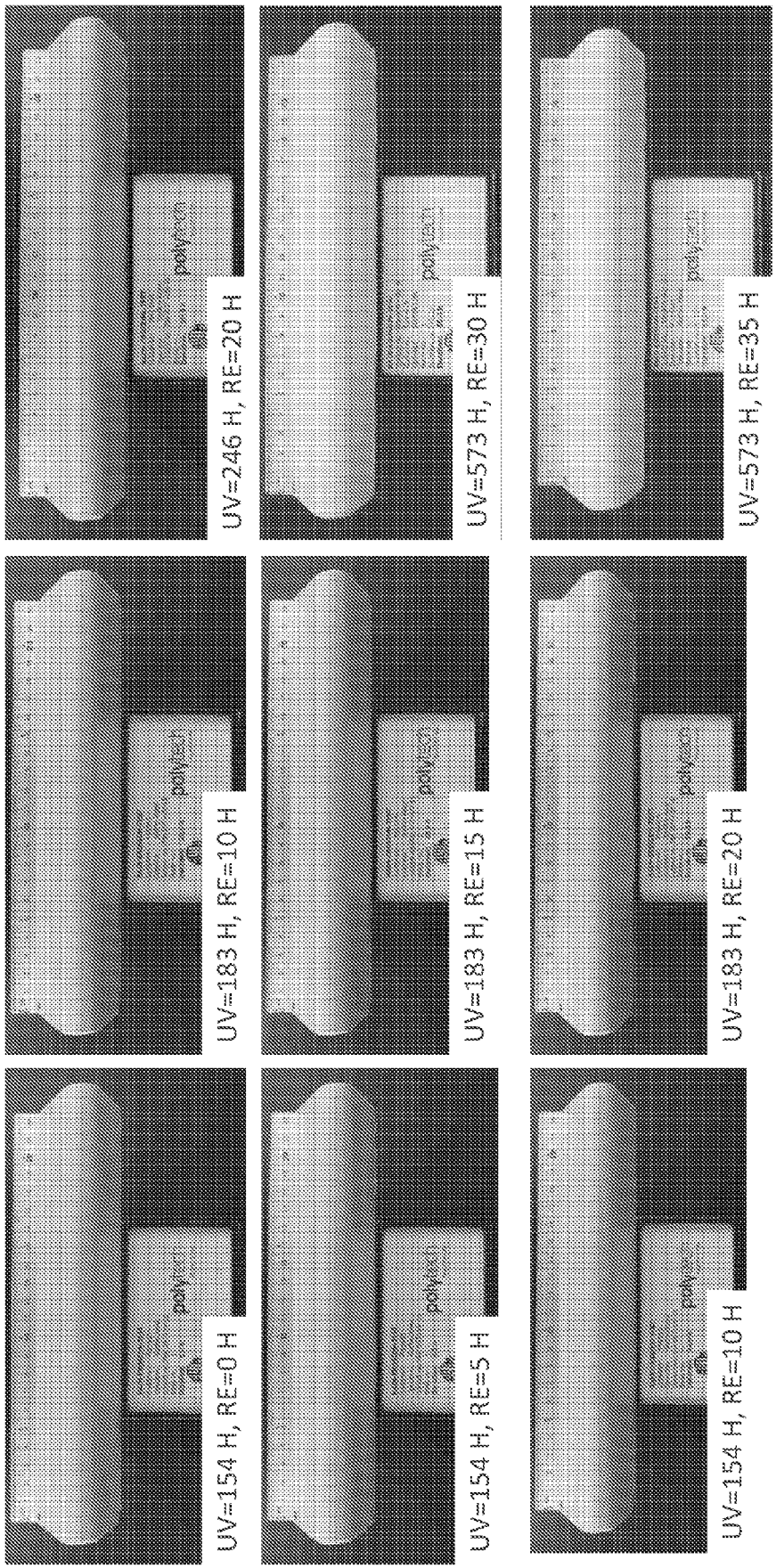

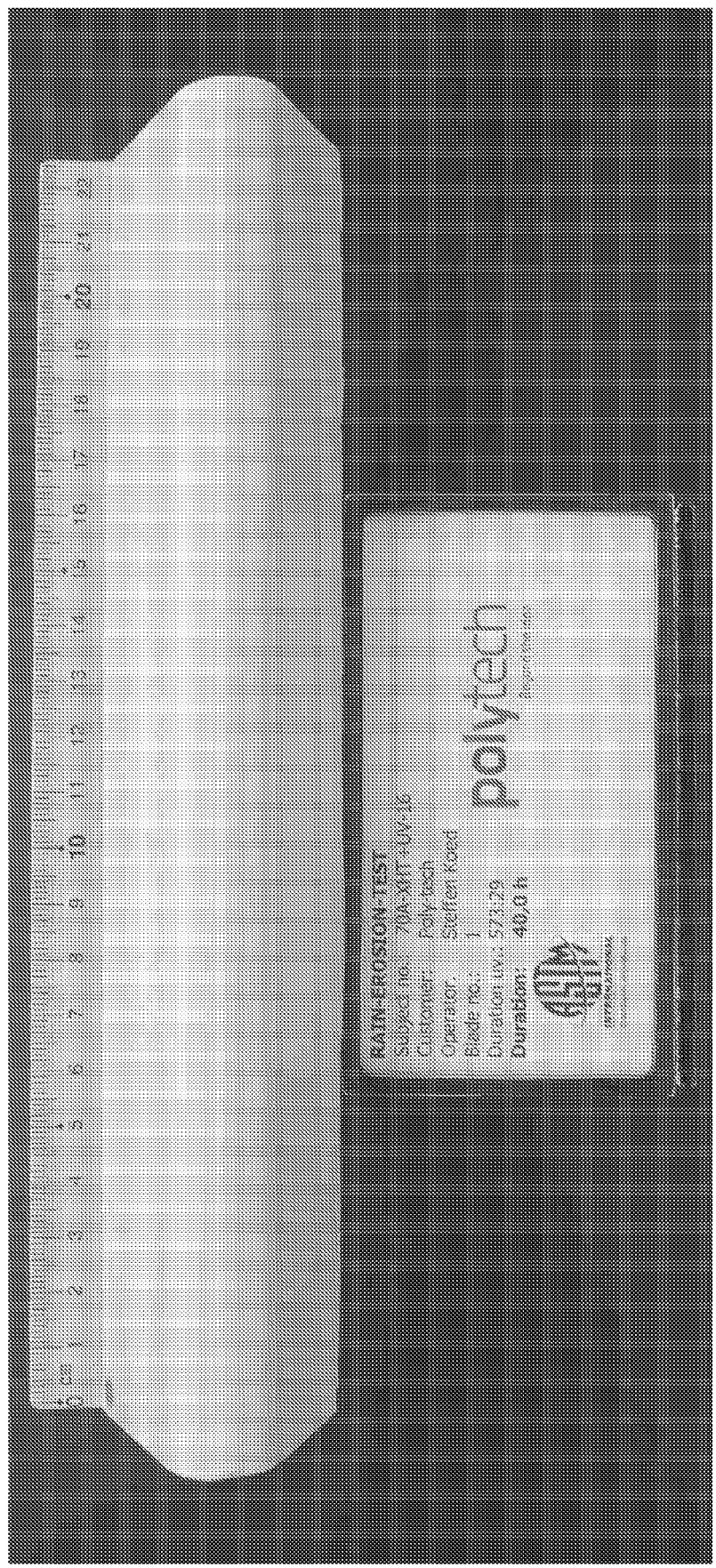
Annex A-3

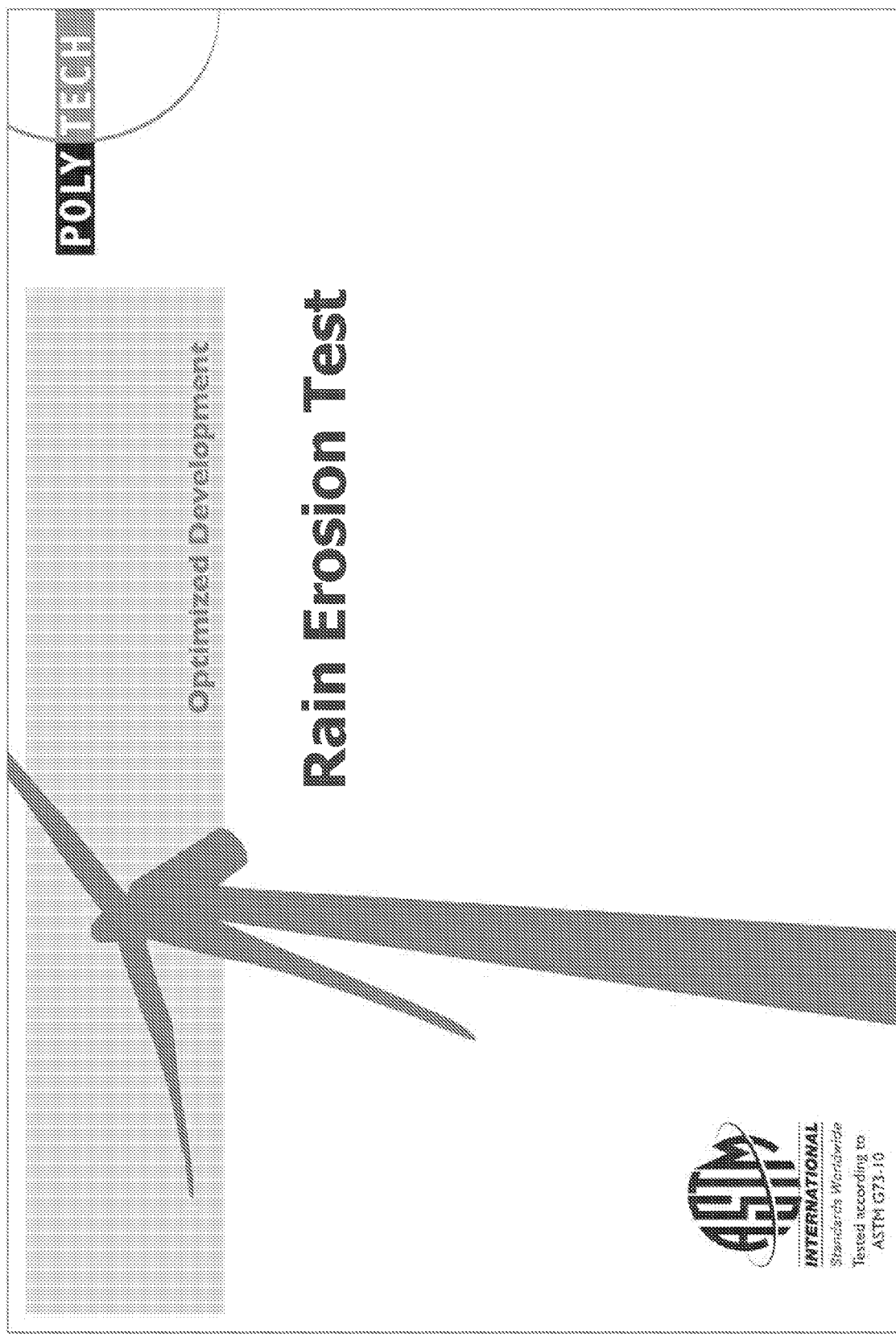

Annex B-2

POLY TECH
Optimized Development

CONTACT INFORMATION
Consumer:
Contact:
Date:

SUBJECT INFORMATION

| | |
|---|---|
| Test reference no: | |
| Tested by: | Steffen Koed |
| Specimen: | A |
| Start weight: [g] | 337,676 |
| End weight: [g] | 329,200 |
| Alignment: [g] | 0 |
| Test position: | 1 |

TEST SPECIFICATIONS

| | |
|---|---|
| Duration [h] | 11,5 |
| Vroot [m/s] | 126 |
| Vcenter [m/s] | 143 |
| Vtip: [m/s] | 160 |
| Rain: [mm/h] | 30-35 |
| Droplet size [mm] | 1-2 |
| Temperature: [c] | 20-25 |

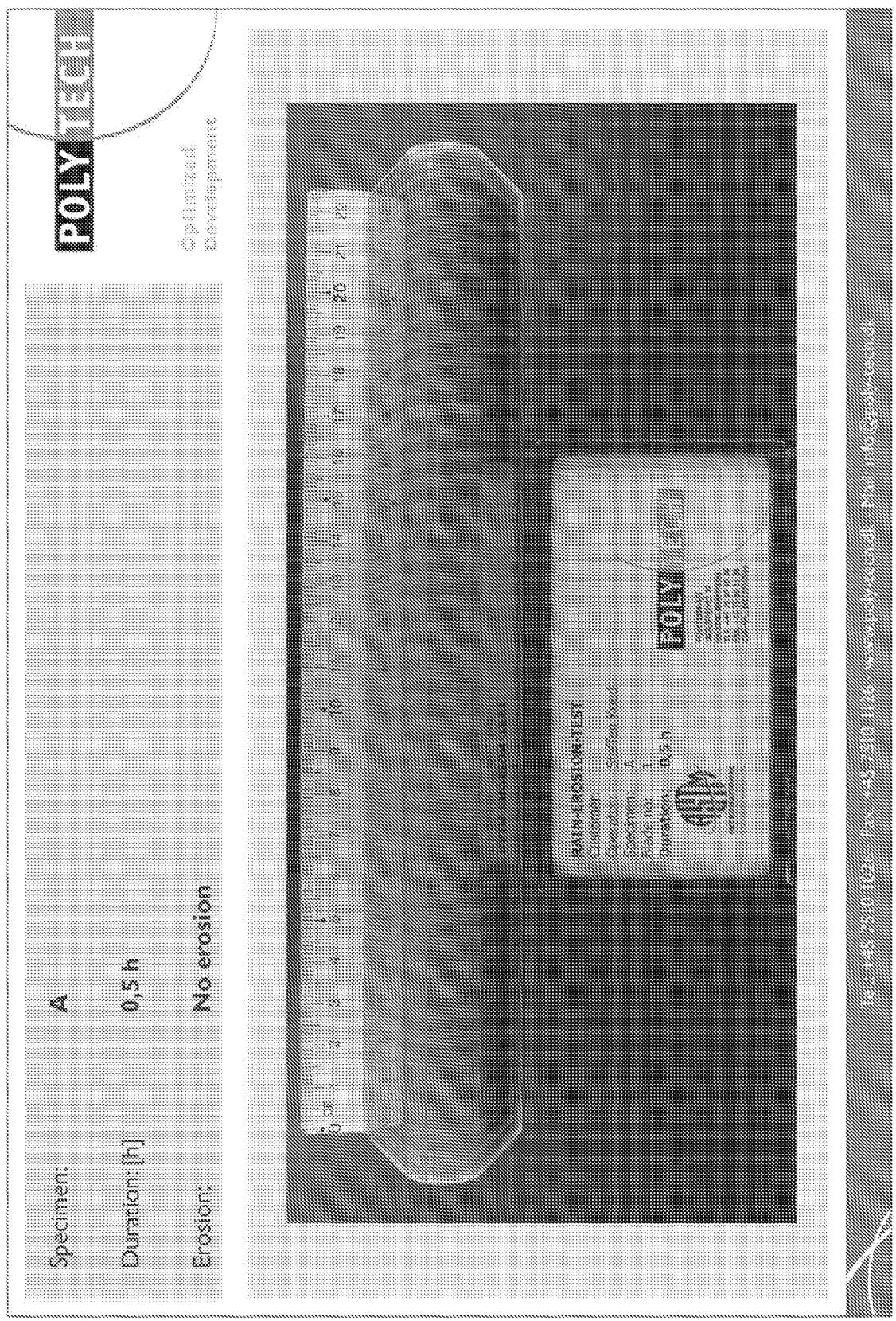

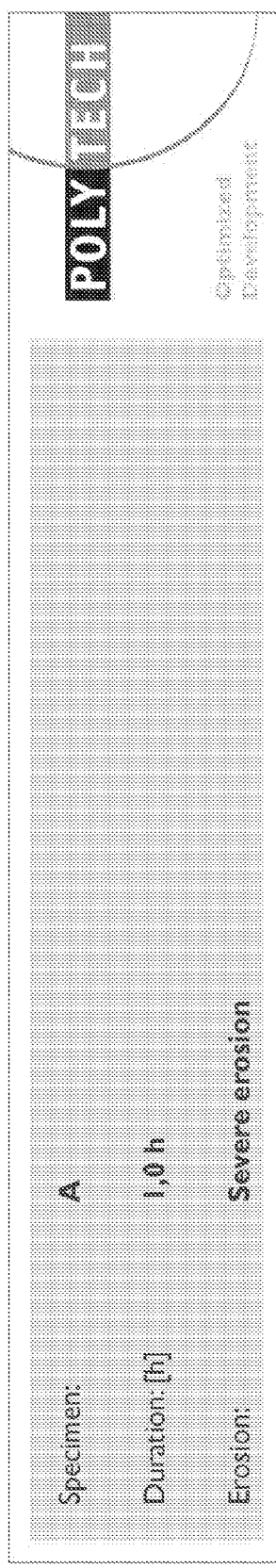

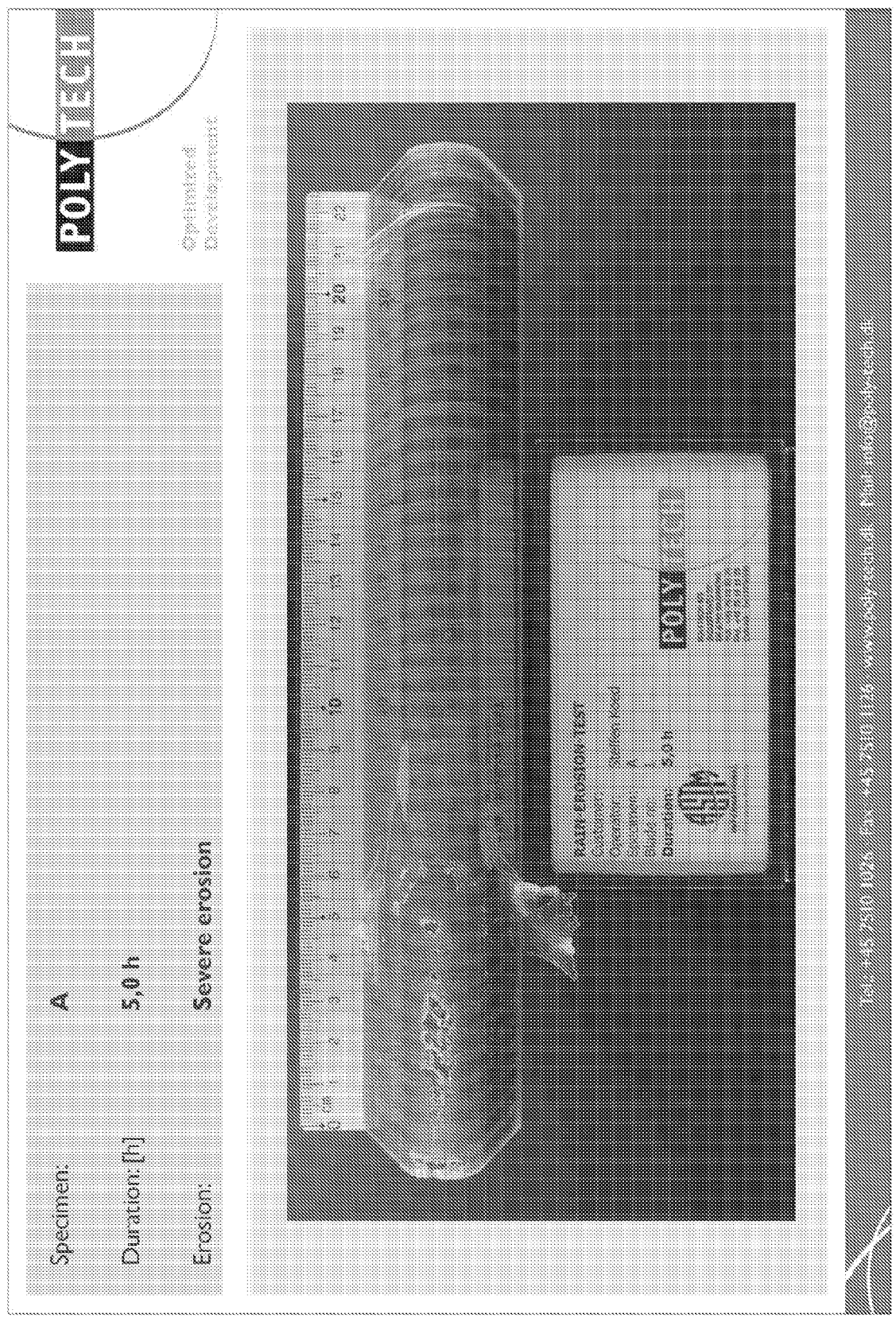

Annex C-1

CONTACT INFORMATION
Costumer:
Contact:
Date:

POLYTECH
Optimized Development

| SUBJECT INFORMATION | | TEST SPECIFICATIONS | |
|---|---|---|---|
| Test reference no: | | Duration [h] | 21 |
| Tested by: | Steffen Koed | Vroot [m/s] | 126 |
| Specimen: | M | Vcenter [m/s] | 143 |
| Start weight: [g] | 333,142 | Vtip: [m/s] | 160 |
| End weight: [g] | 330,074 | Rain: [mm/h] | 30-35 |
| Alignment: [g] | 5 | Droplet size [mm] | 1-2 |
| Test position: | 2 | Temperature: [c] | 20-25 |

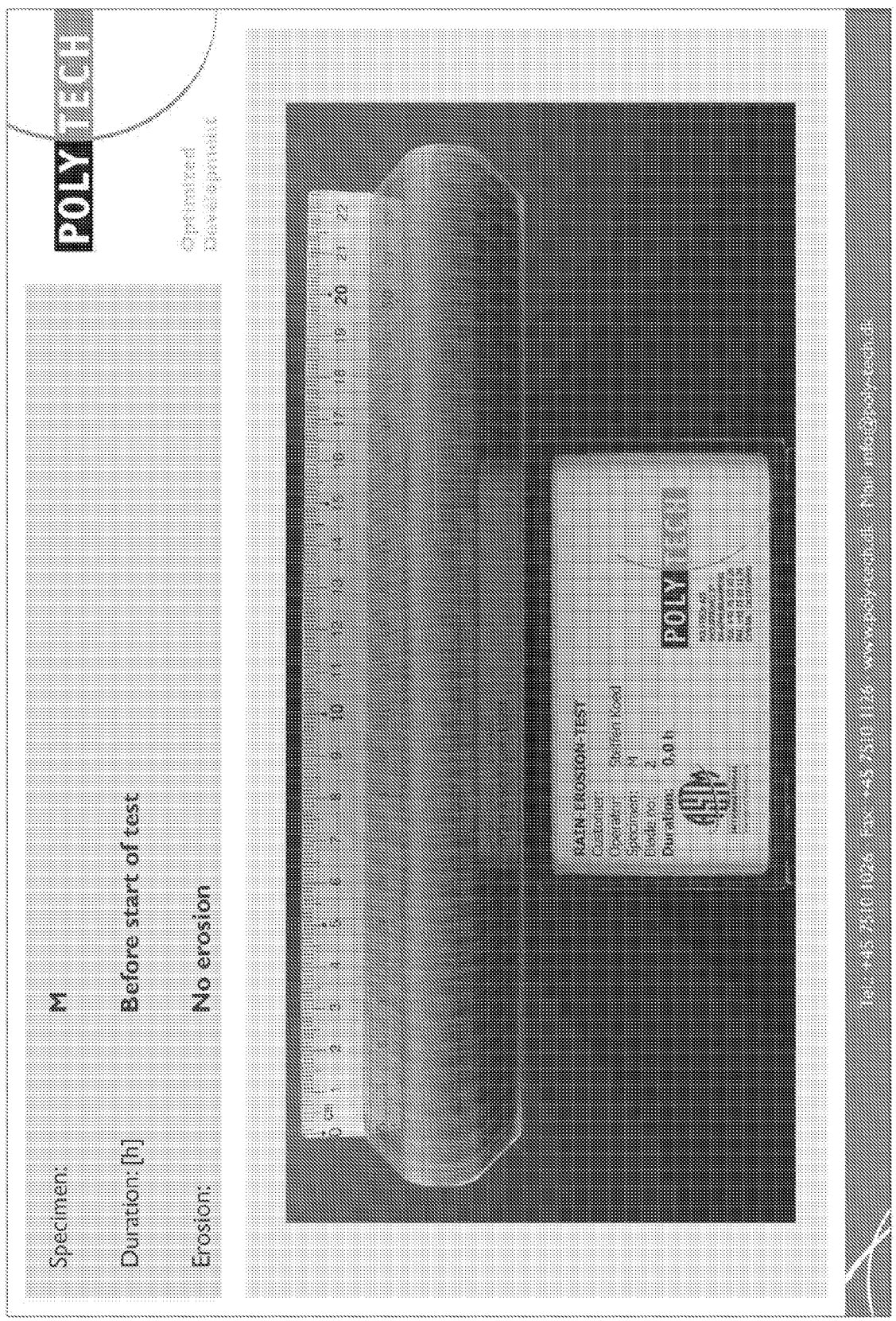

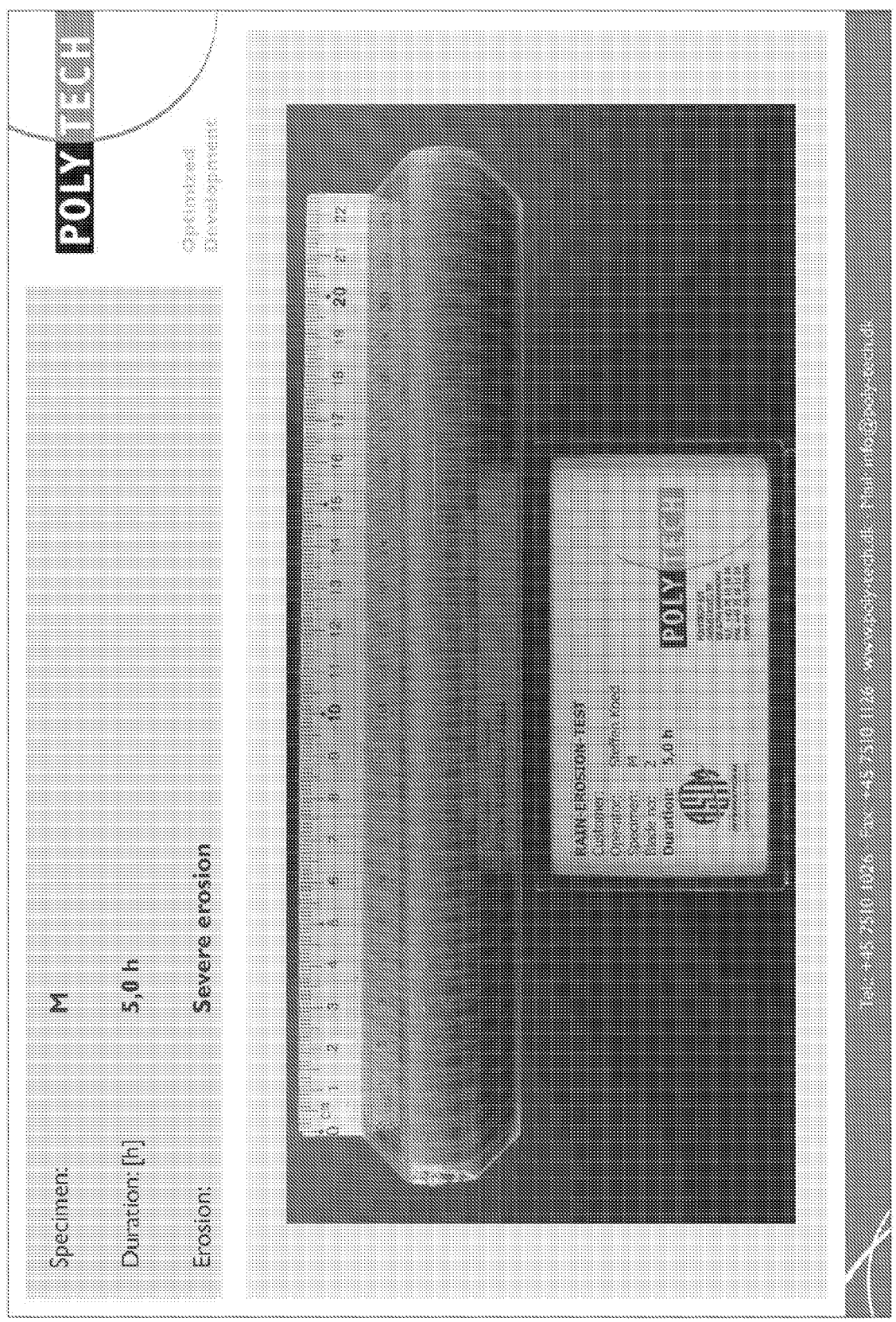

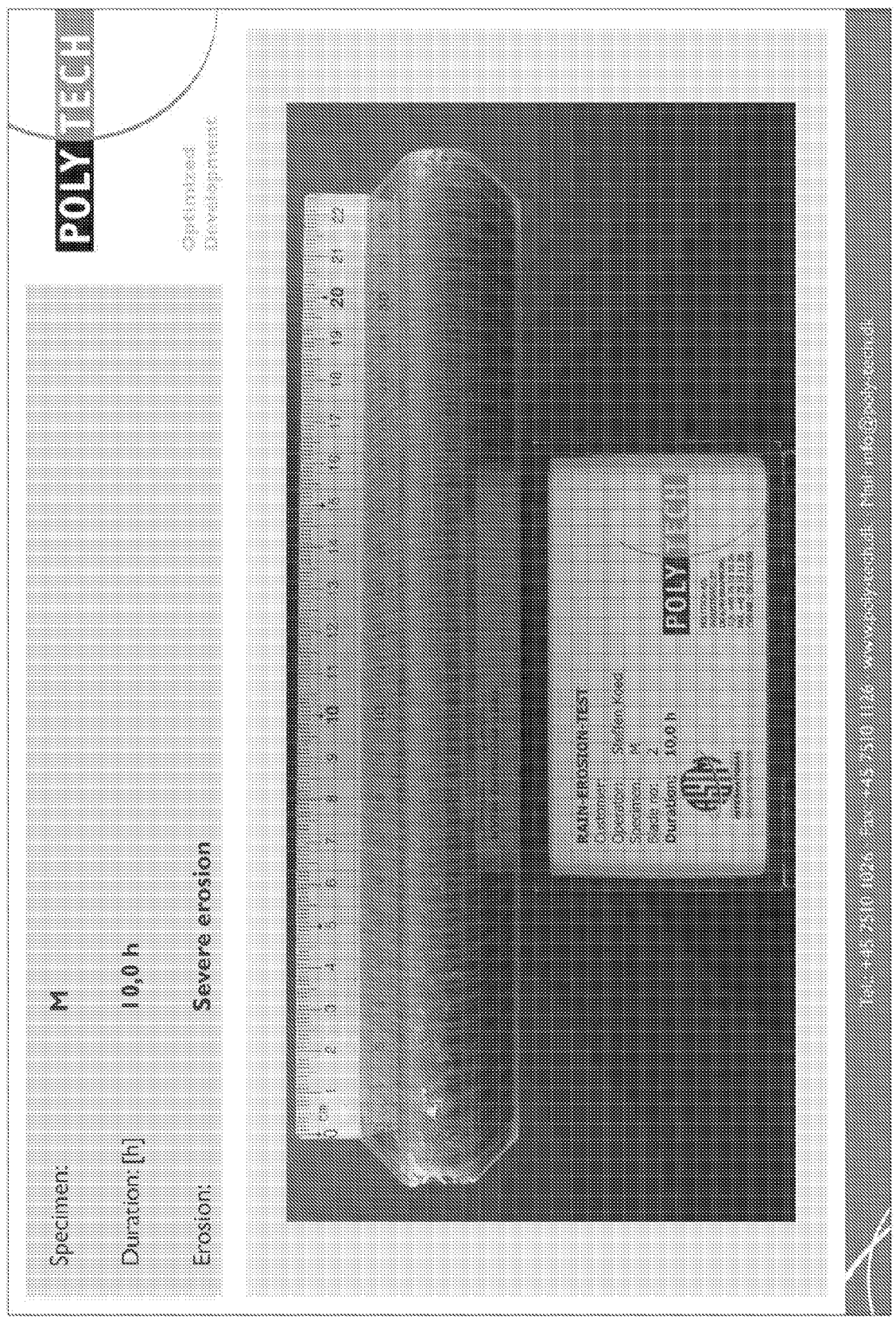

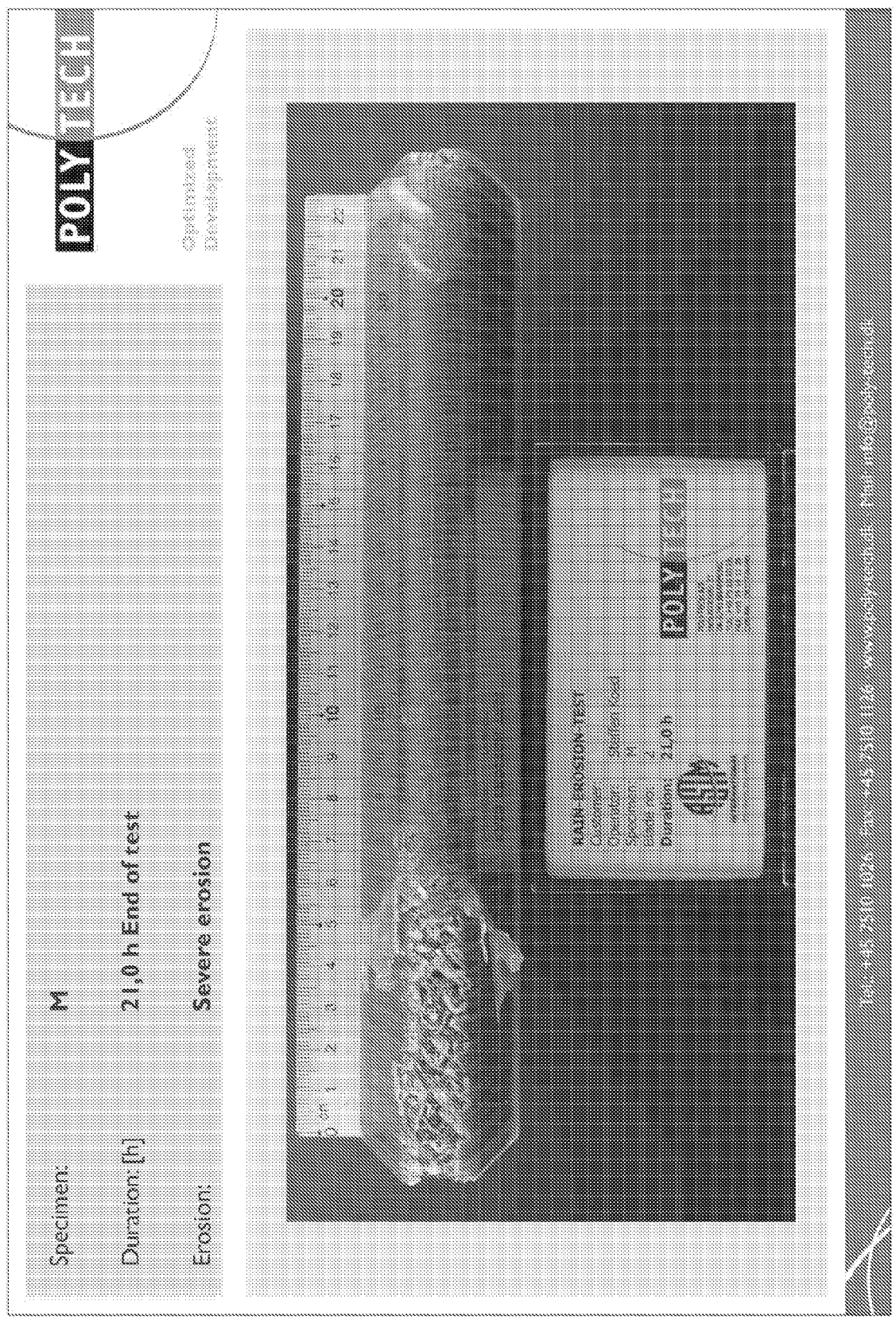

Annex D-1

CONTACT INFORMATION
Costumer:
Contact:
Date:

SUBJECT INFORMATION

| | |
|---|---|
| Test reference no: | |
| Tested by: | Steffen Koed |
| Specimen: | X |
| Start weight: [g] | 333,111 |
| End weight: [g] | 326,425 |
| Alignment: [g] | 5 |
| Test position: | 3 |

TEST SPECIFICATIONS

| | |
|---|---|
| Duration [h] | 3,5 |
| Vroot [m/s] | 126 |
| Vcenter [m/s] | 143 |
| Vtip: [m/s] | 160 |
| Rain: [mm/h] | 30-35 |
| Droplet size [mm] | 1-2 |
| Temperature: [c] | 20-25 |

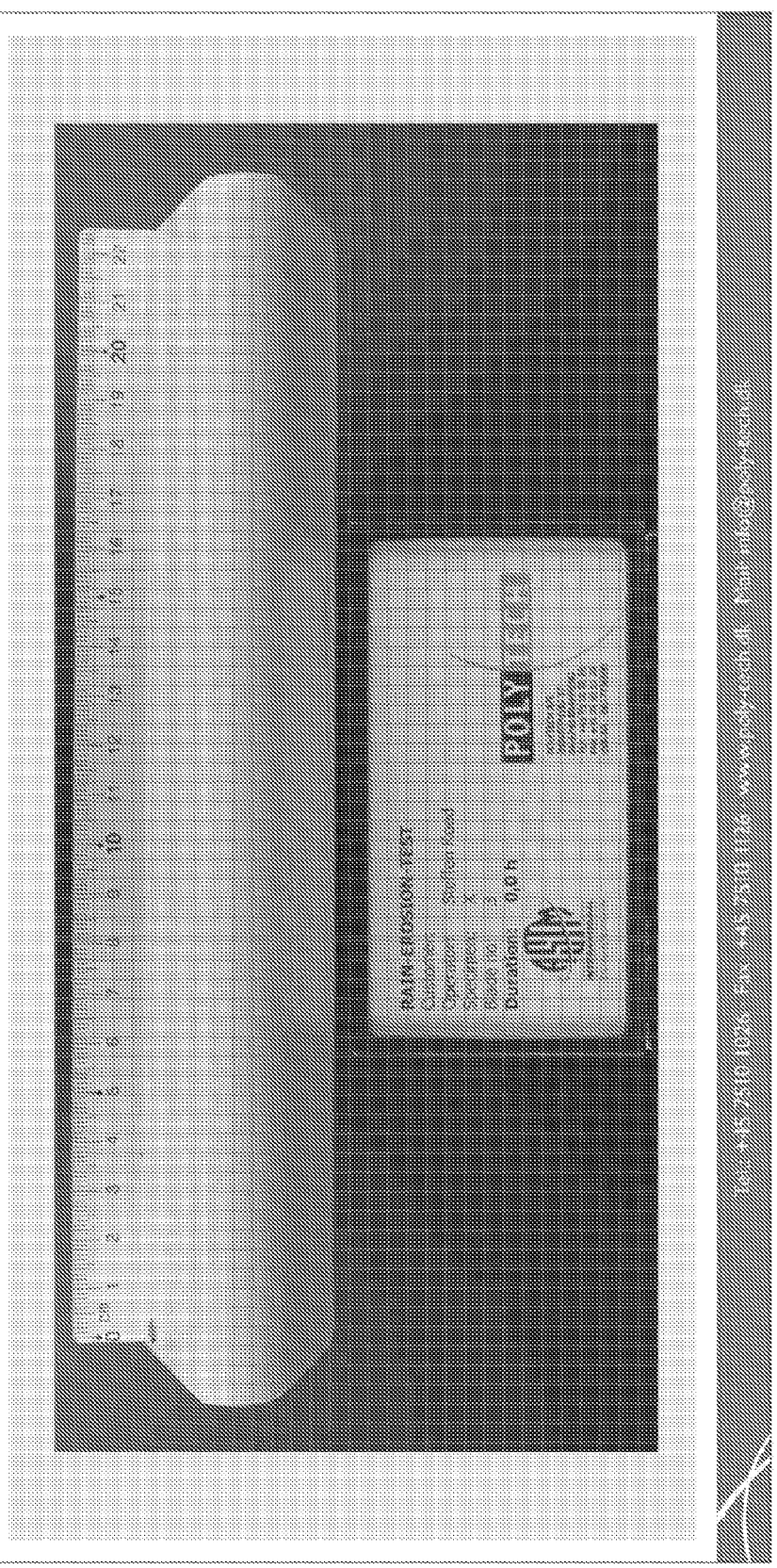
Annex D-2
Specimen: X
Duration [h]: Before start of test
Erosion: No erosion

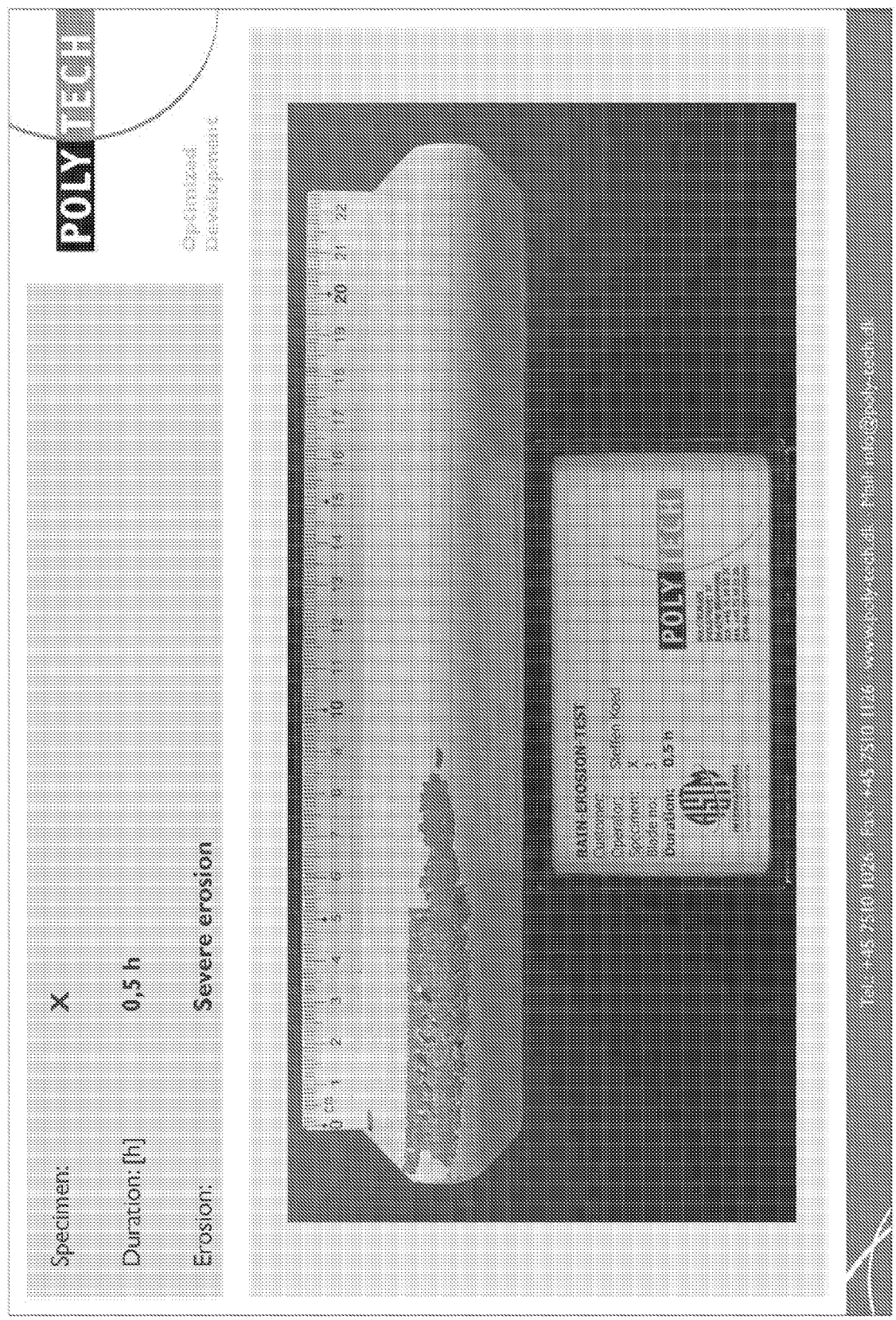

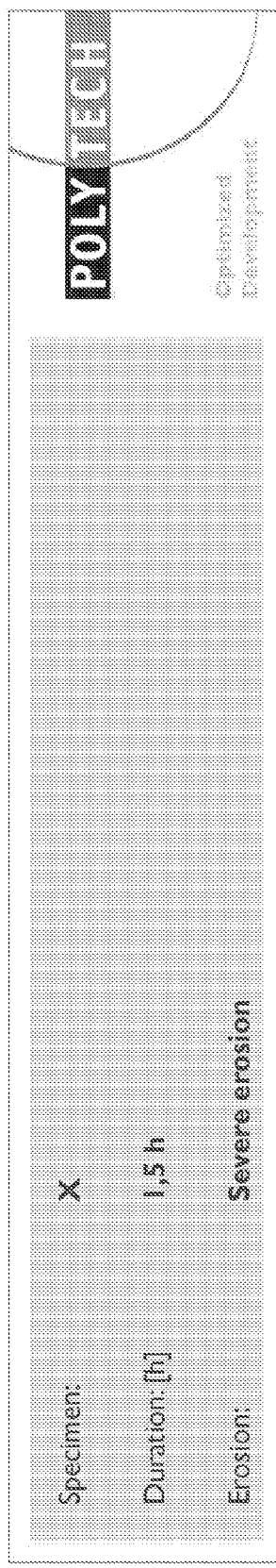

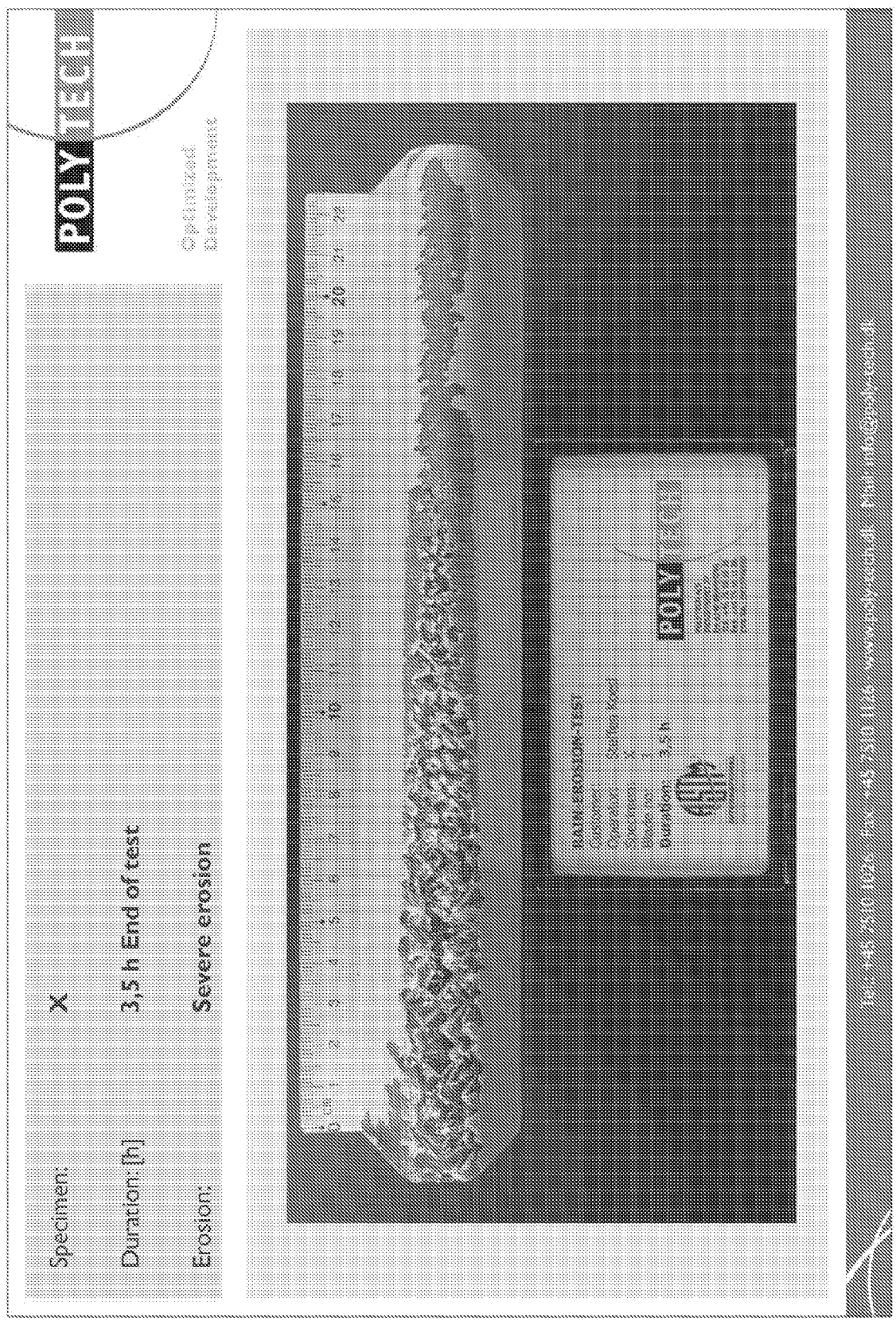

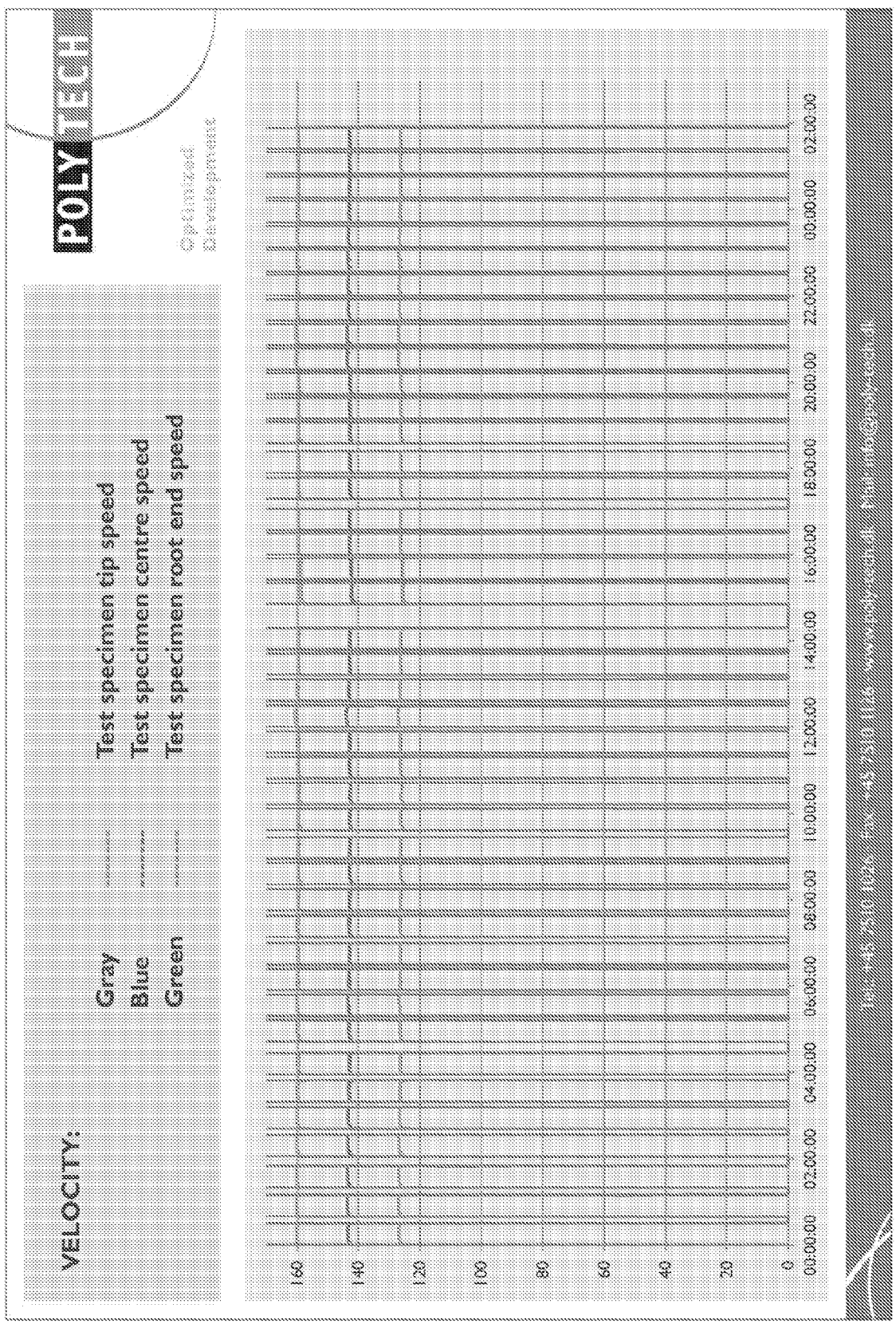

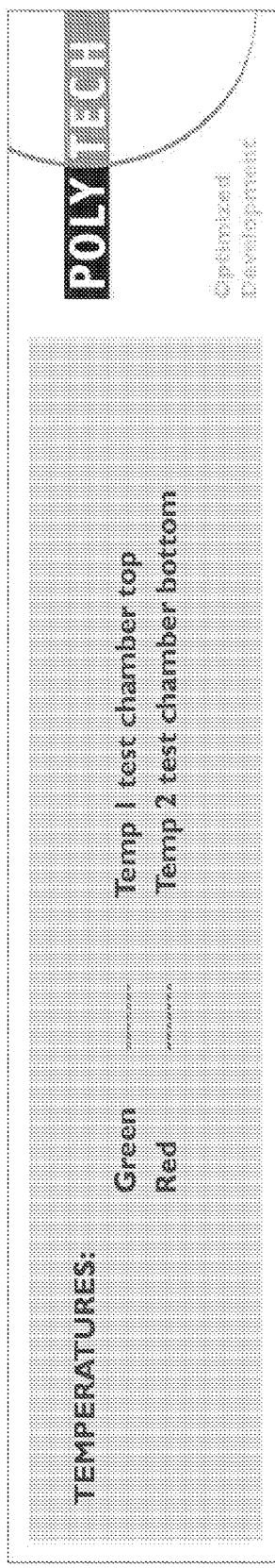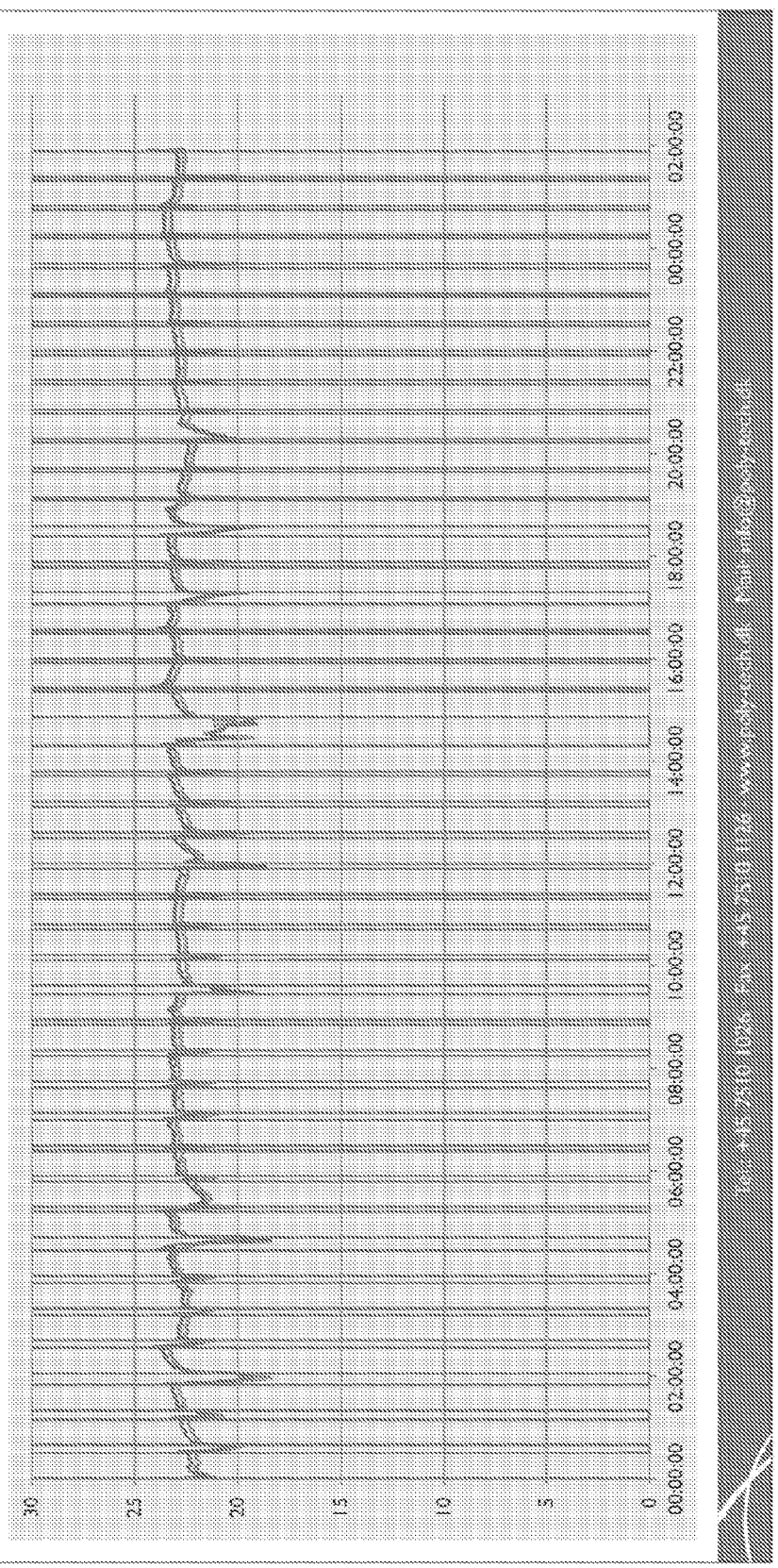

The invention claimed is:

1. A preformed protective cover for a wind turbine blade, wherein the preformed protective cover is made of a polyurethane material prepared from a polyol, butanediol, and an isocyanate, wherein the preformed protective cover is adapted to be attached along at least a part of a longitudinal edge of the wind turbine blade by adhesion of an inside of the preformed protective cover to a surface of the longitudinal edge of the wind turbine blade, wherein the preformed protective cover is elongated in a longitudinal direction and has an U-formed cross-section, wherein the preformed protective cover includes a central cover section extending in the longitudinal direction and two peripheral cover sections extending in the longitudinal direction at either side of the central cover section, respectively, wherein the central cover section has a minimum thickness of at least 1 millimetre, and each peripheral cover section has a thickness decreasing from a maximum thickness of at least 1 millimetre to a minimum thickness of less than ½ millimetre,
wherein the polyol, butanediol, and isocyanate are used in a ratio by weight polyol:butanediol:isocyanate of 100:(3 to 5):(30 to 35).

2. The preformed protective cover according to claim 1, wherein the maximum thickness of each peripheral cover section is equal to the minimum thickness of the central cover section.

3. The preformed protective cover according to claim 1, wherein the minimum thickness of the central cover section is at least 2 millimetres.

4. The preformed protective cover according to claim 1, wherein the thickness of the central cover section is constant from side to side of the central cover section.

5. The preformed protective cover according to claim 1, wherein the minimum thickness of each peripheral cover section is less than ⅓ millimetre.

6. The preformed protective cover according to claim 1, wherein each peripheral cover section has a thickness decreasing constantly from its maximum thickness to its minimum thickness.

7. The preformed protective cover according to claim 1, wherein a width of each peripheral cover section is at least 3 percent of a total width of the preformed protective cover.

8. The preformed protective cover according to claim 1, wherein a total width of the preformed protective cover is at least 30 millimetres.

9. The preformed protective cover according to claim 1, wherein the isocyanate is an optionally modified diphenylmethane 4,4'-diisocyanate.

10. The preformed protective cover according to claim 1, wherein the butanediol is 1,4-butanediol.

11. The preformed protective cover according to claim 1, wherein the polyurethane comprises an UV stabilisator and/or colour pigment(s).

12. The preformed protective cover according to claim 1, wherein the polyol, butanediol, and isocyanate are used in a ratio by weight polyol:butanediol:isocyanate of 100:4:32.3.

13. The preformed protective cover according to claim 1, wherein the polyol comprises an UV stabilisator and/or colour pigment(s).

14. The preformed protective cover according to claim 1, wherein butanediol is 1,4-butanediol.

15. A wind turbine blade including a preformed protective cover according to claim 1, wherein the preformed protective cover is attached along at least a part of a longitudinal edge of the wind turbine blade by adhesion to a surface of the longitudinal edge of the wind turbine blade.

16. The wind turbine blade according to claim 15, wherein the wind turbine blade includes a first blade shell and a second blade shell joined together to form a wind turbine blade along a first longitudinal joint at a leading edge of the wind turbine blade and along a second longitudinal joint at a trailing edge of the wind turbine blade, and wherein the preformed protective cover is symmetrically attached to the first or second longitudinal joint.

17. A method of providing a wind turbine blade with a preformed protective cover according to claim 1, whereby the preformed protective cover is prepared by
a) mixing a polyol and butanediol to form a mixture,
b) tempering and degassing the mixture,
c) tempering and degassing an isocyanate,
d) pumping the degassed mixture from step b) and the degasses isocyanate from step c) through a mixing head into a mould,
e) curing in the mould, and
f) demoulding the preformed protective cover from the mould,
whereby the preformed protective cover is attached along at least a part of a longitudinal edge of the wind turbine blade by adhesion of the inside of the preformed protective cover to a surface of the longitudinal edge of the wind turbine blade, whereby the adhesion is performed by the following steps:
providing an adhesive on the inside of the preformed protective cover,
pressing the inside of the preformed protective cover against the surface of the longitudinal edge of the wind turbine blade, and
removing excess adhesive leaking between each peripheral cover section and the surface of the longitudinal edge of the wind turbine blade.

18. The method according to claim 17, whereby the adhesive is provided as string of adhesive on the inside of the preformed protective cover along a longitudinal symmetry axis of the preformed protective cover.

19. The method according to claim 17, wherein the mould is produced by the following steps:
providing a male form part having a geometry resembling or matching the outer geometry of the at least part of the longitudinal edge of the wind turbine blade,
providing a female form part having a geometry matching the male form part, but being slightly larger, and
closing the male form part against the female form part thereby forming a form cavity; and
wherein demoulding the preformed protective cover from the mould includes
opening the form cavity by separating the male form part from the female form part and ejecting the moulded preformed protective cover.

20. The method according to claim 17, whereby the wind turbine blade is provided with the preformed protective cover as a repair operation, whereby an area of said surface of the longitudinal edge of the wind turbine blade corresponding to the preformed protective cover is machined before attachment of the preformed protective cover.

21. The method according to claim 17, whereby the wind turbine blade is provided with the preformed protective cover when the wind turbine blade is still mounted on a wind turbine.

22. The method according to claim 17, whereby the tempering according to b) and/or c) is carried out at a temperature from 30° C. to 50° C.

23. The method according to claim 17, whereby the tempering according to b) and/or c) is carried out at a temperature of 40° C.

24. The method according to claim 17, whereby the mould in step d) is preheated.

25. The method according to claim 24, whereby the mould in step d) is preheated to a temperature from 90° C. to 120° C.

26. The method according to claim 25, whereby the mould in step d) is preheated to a temperature of 100° C.

27. The method according to claim 17, whereby the curing in step e) is carried out at a temperature from 90° C. to 120° C.

28. The method according to claim 27, whereby the curing in step e) is carried out at a temperature of 100° C.

29. The method according to claim 17, whereby the curing in step e) is carried out for about 15 minutes.

30. The method according to claim 17, comprising a further step: g) post-curing.

31. The method according to claim 30, whereby the post-curing in step g) takes place in 12 hours at a temperature of 100° C.

32. The method according to claim 17, whereby the polyol, butanediol, and isocyanate are used in a ratio by weight polyol:butanediol:isocyanate of 100:4:32.3.

33. The method according to claim 17, whereby the polyol comprises an UV stabilisator and/or colour pigment(s).

34. The method according to claim 17, whereby butanediol is 1,4-butanediol.

* * * * *